United States Patent [19]

Yumiba et al.

[11] Patent Number: 5,289,295
[45] Date of Patent: Feb. 22, 1994

[54] COLOR ADJUSTMENT APPARATUS

[75] Inventors: Takashi Yumiba; Haruo Yamashita, both of Osaka, Japan

[73] Assignee: Matsushita Electric Industrial Co., Ltd., Osaka, Japan

[21] Appl. No.: 910,833

[22] Filed: Jul. 6, 1992

[30] Foreign Application Priority Data

Jul. 4, 1991 [JP] Japan ................. 3-164319
Dec. 12, 1991 [JP] Japan ................. 3-328920

[51] Int. Cl.$^5$ ............................................. H04N 1/40
[52] U.S. Cl. ................................. 358/518; 358/515
[58] Field of Search ................ 358/515, 518–525, 358/11, 28–29, 39

[56] References Cited

U.S. PATENT DOCUMENTS

| | | | |
|---|---|---|---|
| 4,649,423 | 3/1987 | Hoffrichter et al. | 358/80 |
| 4,668,979 | 5/1987 | Jüng | 358/75 |
| 4,774,567 | 9/1988 | Stansfield et al. | 358/518 |
| 4,873,570 | 10/1989 | Suzuki et al. | 358/515 |
| 4,941,038 | 7/1990 | Walowit | 358/518 |
| 5,047,842 | 9/1991 | Bouman, Jr. et al. | 358/515 |
| 5,185,661 | 2/1993 | Ng | 358/515 |
| 5,200,816 | 4/1993 | Rose | 358/518 |
| 5,200,817 | 4/1993 | Birnbaum | 358/518 |

Primary Examiner—Stephen Brinich
Attorney, Agent, or Firm—Ratner & Prestia

[57] ABSTRACT

A color adjustment apparatus includes a color space conversion circuit for obtaining a chromaticity signal in a rectangular coordinate system of a plane representing hue and saturation components. A pointed color chromaticity signal setting circuit sets a pointed color chromaticity signal, which is the prominent color chromaticity signal desired to be changed. A color adjustment area setting circuit sets a color adjustment area of which the center is the pointed color chromaticity signal. A target color chromaticity signal setting circuit sets a target color chromaticity signal. A color conversion circuit generates a converted chromaticity signal $(u_h^*, v_h^*)$. The converted chromaticity signal is obtained by shifting an original chromaticity signal $(u^*, v^*)$ by an amount equal to a change from said pointed color chromaticity signal to said target color chromaticity signal. A weighting coefficient setting circuit sets a weighting coefficient $(\omega)$. And a color adjustment operating circuit generates a corrected chromaticity signal $(u_0^*, v_0^*)$ which is a sum of the converted chromaticity signal and the original chromaticity signal added at the rate of the weighting coefficient $(\omega)$.

21 Claims, 16 Drawing Sheets

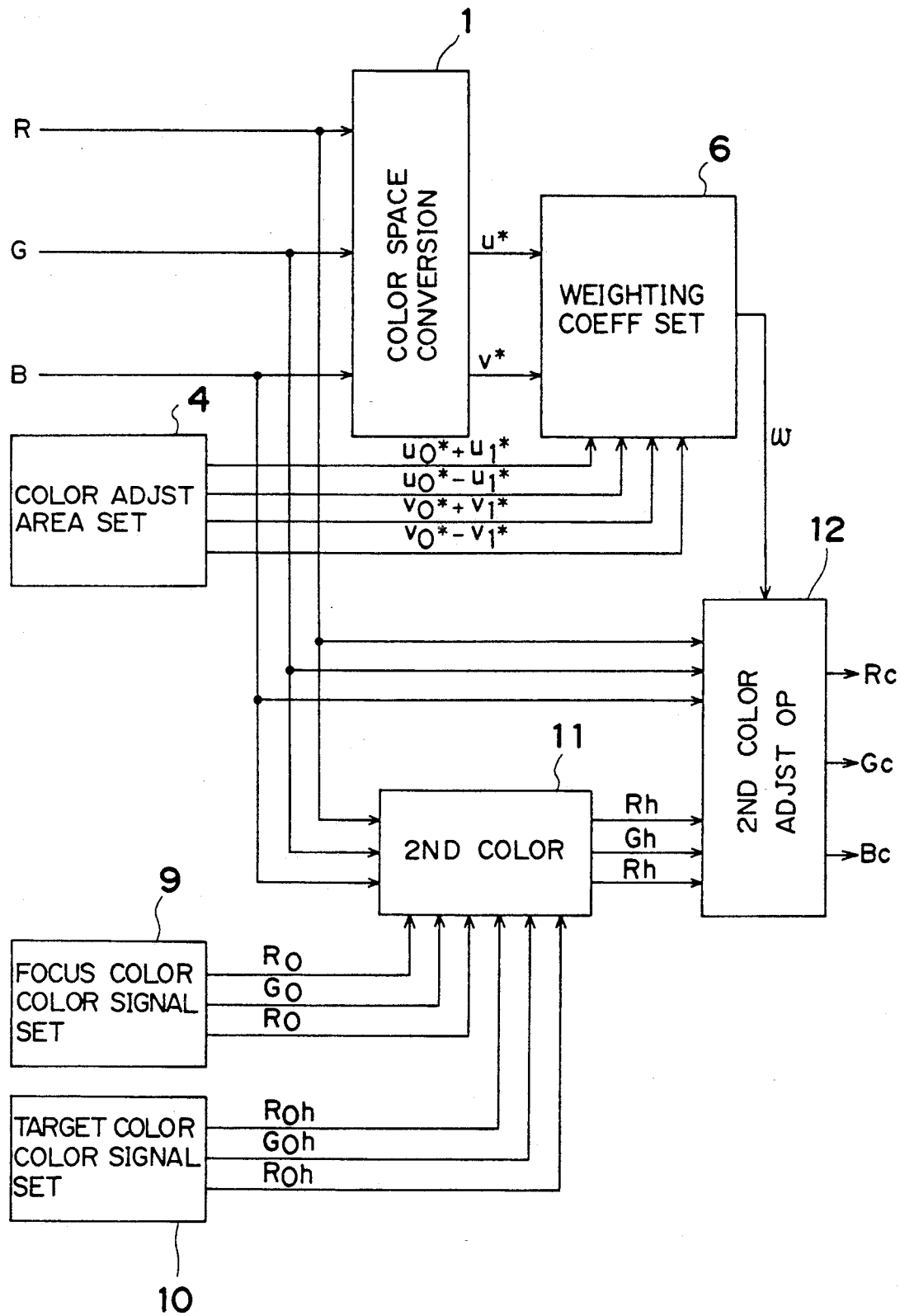

COLOR ADJUSTMENT APPARATUS

BACKGROUND OF THE INVENTION

1. Field of the invention

The present invention relates to a selective color adjustment apparatus for use in color printers, color photocopiers, color televisions, and other color image processing devices and, more particularly, to a selective color adjustment apparatus which can change the color of a selected part of an image while maintaining the color of other parts unchanged and retaining color continuity between the changed part and unchanged part.

2. Prior art

As color imaging devices have been improved to provide higher image quality and some intelligent control capabilities in recent years, an improved color adjustment capability has become necessary to meet the more sophisticated needs of the end user. The color adjustment function of a typical conventional device is described below with reference to FIGS. 18-20.

FIG. 18 is a block diagram showing the basic construction of a conventional color adjustment device comprising a color space conversion circuit 100, polar coordinate conversion circuit 101, a selective color adjustment circuit 102, and a color space reconversion circuit 103. The color space conversion circuit 100 takes an RGB trichromatic expression of the input color and converts it through the XYZ color system to a uniform color space $L^*a^*b^*$ expression of the color. The polar coordinate conversion circuit 101 then converts the uniform color space $L^*a^*b^*$ expression to the $L^*a^*b^*$ coordinate system's internal polar coordinate system ($H°Cab$, $L^*$, $C^*ab$). After selective color adjustment is applied by the selective color adjustment circuit 102 as described below, the color space reconversion circuit 103 reverses the color expression conversion process, converting the ($H^*ab$, $L^*$, $C^*ab$) expression to the uniform color space $L^*a^*b^*$, and through the XYZ system to obtain the RGB line output.

Operation of the selective color adjustment circuit 102 is described with reference to FIG. 19, a graph of the method of specifying the color adjustment area, and FIG. 20, a graph of the color adjustment specification method.

Colors are adjusted on the $a^*b^*$ polar coordinate plane, i.e., the chromaticity plane, using only the hue angle H°ab and saturation $C°ab$ values. The hue is specified using the range angle HA(°) and the median hue angle HC(°), saturation is specified using the band width $CA^*$ and the median saturation value $CC^*$, and the target area for color adjustment is specified from the combination of these two areas as indicated by the shaded area in FIG. 19. The direction and amount of color change are specified using two color adjustment parameters in the $H^*ab$, $C^*ab$ coordinate system, hue rotation of the amount DH(°) plus or minus the median hue angle, and saturation is increased or decreased Kc times.

This adjustment made using just two parameters results in a loss of continuity in the hue and saturation of the input and output colors because certain colors are suddenly changed to different colors in the color space. In addition, the median values and range of the color distribution used to specify the target color area may vary and cannot be precisely specified because of the wide differences between input images.

Membership functions allowing a certain degree of latitude are therefore applied to specify the target color area. By thus weighting the color adjustment using the membership function value, continuity in the color space can also be maintained. The selective color adjustment can be quantified as shown by equation (2) when the two-dimensional membership function in the $a^*b^*$ plane is obtained by equation (1).

$$W(H^\tau ab, C^*ab) = WH(H^\tau ab) \times WC(C^*ab) \quad (1)$$

in which $0 \leq WH(H^\tau ab) \leq 1$ $0 \leq WC(C^*ab) \leq 1$ $$\begin{pmatrix} H^\tau ab' \\ C^*AB' \end{pmatrix} = \begin{pmatrix} H^\tau ab \\ C^*ab \end{pmatrix} + W(H^\tau ab, C^*ab) \begin{pmatrix} DH \\ (Lc - 1)C^*ab \end{pmatrix} \quad (2)$$

where ($H^*ab$, $C^*ab$) are the color coordinates before color adjustment, ($H^*ab'$, $C^*ab'$) are the color coordinates after color adjustment, DH is the angle of rotation of hue $H^*ab$, and Kc is the multiple of saturation $C^*ab$. The color adjustment is thus determined uniquely by the membership function $WH(H^*ab)$, $WC(C^*ab)$, and DH, Kc.

The color adjustment device described above operates as follows.

The RGB trichromatic expression of the input color is converted through the XYZ color system to the CIE 1976 uniform color space $L^*a^*b^*$ expression by the color space conversion circuit 100. The uniform color space $L^*a^*b^*$ expression is then converted to the internal polar coordinate system ($H°ab$, $C^*ab$) of the $L^*a^*b^*$ coordinate system by the polar coordinate conversion circuit 101 as defined by equation (3).

$$H^\tau ab = \arctan(b^*/a^*) \quad (3)$$
$$C^*ab = ((a^*)^2 + (b^*)^2)^{\frac{1}{2}}$$

The selective color adjustment circuit 102 then adjusts the color using the two-dimensional membership function described above. The color coordinates ($H°ab$, $C^*ab$) and $L^*$ resulting from the adjustment are then reconverted to a standard $L^*a^*b^*$ expression, to an XYZ system expression, and finally to an RGB trichromatic expression to obtain a selectively adjusted color signal (see Journal of the Electronic Imaging Association, Vol. 18, No. 5, pp. 302-312).

The following problems are presented by this color adjustment method.

First, selective color adjustment requires a polar coordinate conversion to convert the RGB trichromatic signal to the uniform color space $L^*a^*b^*$ system and to the $L^*a^*b^*$ internal polar coordinate system ($H°ab$, $L^*$, $C^*ab$), and rectangular coordinate conversion to convert from the ($H°ab$, $L^*$, $C^*ab$) system to the $L^*a^*b^*$ system after color adjustment, and these operations are difficult to perform in real-time because they are non-linear operations.

Furthermore, while look-up tables can be used to increase the processing speed of these non-linear operations, it is difficult to generate these conversion tables and a large number of conversion tables is needed, increasing the required circuit (device) size. In addition, if the precision of these non-linear operations is increased, the required circuit size is increased even further because of the large number of bits required.

Analog processing of this color adjustment process is also extremely difficult because of the polar coordinate conversion and other non-linear conversions required, and this method is not suited to real-time color adjustment processing of a video signal.

In addition, if the operating precision is to be increased, a large number of bits is required at the uniform color space L*a*b* stage before conversion to the polar coordinate system because of the matrix operations performed in the polar coordinate system as shown in equation (2).

Finally, while this color adjustment method can change the hue and saturation of the source signal, it cannot adjust the brightness.

SUMMARY OF THE INVENTION

Therefore, an object of the present invention is to provide a color adjustment apparatus enabling selective color adjustment and easy adjustment of brightness with real-time processing of video signals and other image signals by means of a device featuring a simple circuit construction, small circuit scale, and high precision operation.

To achieve this object, a color adjustment apparatus according to the present invention comprises a color space conversion means for obtaining a chromaticity signal representing two elements of a rectangular coordinate system of a plane representing two of the three attributes of color, specifically hue and saturation components; a pointed color chromaticity signal setting means for setting a pointed color chromaticity signal; a color adjustment area setting means for setting in the rectangular coordinate system a color adjustment area of which the center is the pointed color chromaticity signal set by the pointed color chromaticity signal setting means; a target color chromaticity signal setting means for setting in the rectangular coordinate system a target color chromaticity signal; a first color conversion means for generating a converted chromaticity signal ($u_h^*$, $v_h^*$) in said color adjustment area, said converted chromaticity signal obtained by shifting an original chromaticity signal ($u^*$, $v^*$) by an amount equal to a change from said pointed color chromaticity signal to said target color chromaticity signal; weighting coefficient setting means for setting a weighting coefficient ($\omega$) such that the weighting coefficient is highest at the center of said color adjustment area, and is reduced towards the peripheral of said color adjustment area; and a first color adjustment operating means for generating a corrected chromaticity signal ($u_0^*$, $v_0^*$) which is a sum of said converted chromaticity signal and said original chromaticity signal added at the rate of said weighting coefficient An alternative embodiment of the invention comprises a color space conversion means for converting a trichromatic signal to a chromaticity signal representing the two elements of the rectangular coordinate system of the plane representing two of the three attributes of color, specifically the hue and saturation components; a pointed color color signal setting means for setting a pointed color signal expressed by trichromatic color; a color adjustment area setting means for setting in a rectangular coordinate system an area used for color adjustment with said pointed color signal located at the center thereof; a target color color signal setting means for setting a target color signal expressed by trichromatic color;

a second color conversion means for generating a converted color signal ($R_h$, $G_h$, $B_h$) in said color adjustment area, said converted color signal obtained by shifting an original color signal (R, G, B) by an amount equal to a change from said pointed color signal to said target color signal; a weighting coefficient setting means for setting a weighting coefficient ($\omega$) such that the weighting coefficient is highest at the center of said color adjustment area, and is reduced towards the peripheral of said color adjustment area; and a second color adjustment operating means for generating a corrected color signal (Rc, Gc, Bc) which is a sum of said converted color signal and said original color signal added at the rate of said weighting coefficient ($\omega$).

Another alternative embodiment of the invention comprises a means for inputing chromaticity signal; a pointed color chromaticity signal generating means for generating a pointed color chromaticity signal representing the saturation and hue of the pointed color; a subtracting means for subtracting the pointed color chromaticity signal from an original chromaticity signal; a rectification smoothing means for rectifying and smoothing the output of the subtracting means; a limiting means for limiting the output of the rectification smoothing means to be within a predetermined maximum level; a phase shift means for shifting the phase of the original chromaticity signal; an amplification means for amplifying the output of the phase shift means by a predetermined gain level to produce an amplified chromaticity signal; and a third color adjustment operating means for performing an interior division operation on the original chromaticity signal and the amplified chromaticity signal to obtain a color adjusted chromaticity signal.

With the first embodiment of the color adjustment apparatus described above, a pointed color chromaticity signal representing the median of the color area to be converted is set by the pointed color chromaticity signal setting means, and a target color chromaticity signal representing the desired color after signal conversion is set by the target color chromaticity signal setting means. These signals are set in the chromaticity plane representing the hue and saturation components of color. Characteristics enabling the color conversion to operate on the entire chromaticity plane are then set in the first color conversion means for converting the pointed color to the target color. A weighting coefficient is then set by the weighting coefficient setting means according to the difference between the input chromaticity signal and the pointed color chromaticity signal set by the pointed color chromaticity signal setting means, and the output color signal is determined from the output of the first color conversion means and the input chromaticity signal according to the output of the weighting coefficient setting means.

With the first alternative embodiment of the color adjustment apparatus described above, the weighting coefficient is generated by the weighting coefficient setting means according to the distance in the chromaticity plane representing the hue and saturation components between the chromaticity signal obtained from the trichromatic color signal representing the middle of the color area to be converted and set by the pointed color color signal setting means, and the chromaticity signal for the output of the color space conversion means resulting from the trichromatic color signal input to the color space conversion means. The trichromatic color signal of the pointed color is input to the second color conversion means, which has input and output characteristics for converting the trichromatic color signal of the pointed color to the trichromatic color signal of the target color, which is set by the target color color signal setting means and represents the desired color after conversion. The trichromatic color output signal is then determined according to the output of the weighting coefficient setting means from the trichromatic color signal output from the second color conversion means and the input trichromatic color signal.

With the second alternative embodiment of the color adjustment apparatus described above, a sine wave representing the differences between the hue and saturation of the input and pointed colors is generated by subtracting the pointed color chroma signal representing the hue and saturation of the pointed color generated by the pointed color chroma signal generating means for color adjustment from the input chroma signal. The weighting coefficient is obtained by rectifying and smoothing this sine wave using the rectification smoothing means, and then limiting the output of the rectification smoothing means to the color adjustment area using the limiting means. The phase of the input chroma signal is then shifted and amplified, and the output chroma signal is obtained based on the amplified output and the input chroma signal by applying the output from the rectification smoothing means.

BRIEF DESCRIPTION OF THE DRAWINGS

The present invention will become more fully understood from the detailed description given below and the accompanying diagrams wherein:

FIG. 11 is a block diagram of a color adjustment apparatus according to a fourth embodiment of the invention.

DESCRIPTION OF PREFERRED EMBODIMENTS

The preferred embodiments of a color adjustment apparatus according to the present invention are described below with reference to the accompanying figures. Before describing the operation of the invention, the chromaticity signal used in the invention is described first. It should first be noted that color has three attributes, hue (color), value (brightness), and saturation (chroma). The chromaticity signal used in the invention represents two of these three attributes, hue and saturation, using a two-dimensional rectangular coordinate system of hue and saturation values. A chromaticity signal representing two elements of the rectangular coordinate system of the plane representing the hue and saturation components of color could be a color difference signal of color brightness difference signals (e.g., R-Y, B-Y signals), a chroma signal of chroma brightness signals (YC), the observer chromaticness index (U*V*) of the CIE 1964 uniform observer color space (U*V*W*), the observer chromaticness index (u*v*) of the CIE 1976 uniform observer color space (L*u*v*), the observer chromaticness index (a*b*) of the CIE 1976 uniform observer color space (L*a*b*), or the hue H and saturation S of the HLS space. The chromaticity signal of the invention is any chromaticity signal of any of these or other color expressions.

Figure 1:
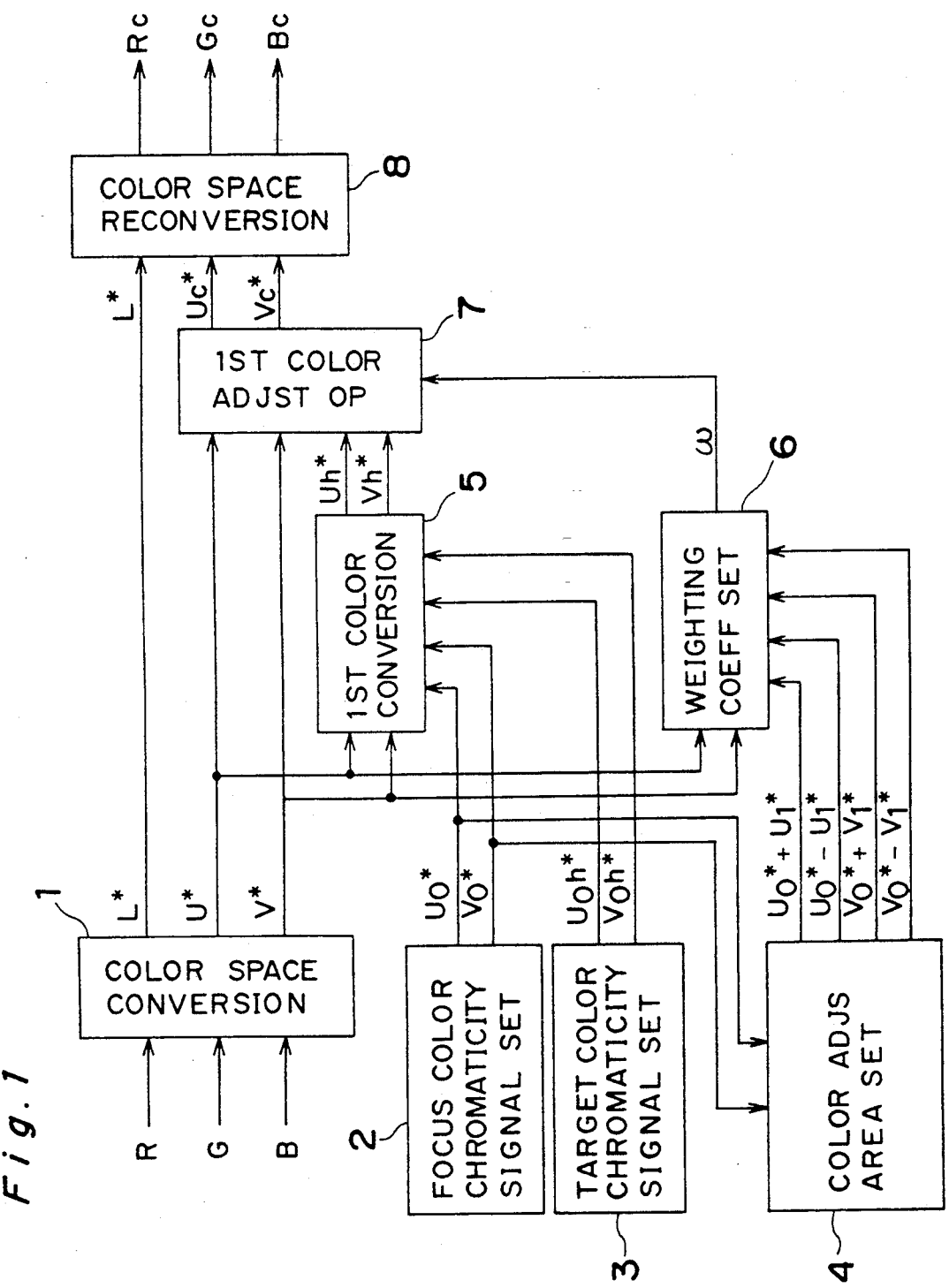
FIG. 1 is a block diagram of a color adjustment apparatus according to a first embodiment of the invention.

FIG. 1 is a block diagram of the color adjustment apparatus according to the first embodiment of the invention. As shown in FIG. 1, this embodiment comprises a color space conversion circuit 1, pointed color chromaticity signal setting circuit 2, target color chromaticity signal setting circuit 3, color adjustment area setting circuit 4, first color conversion circuit 5, weighting coefficient setting circuit 6, first color adjustment operating circuit 7, and a color space reconversion circuit 8.

The color space conversion circuit 1 converts the input color signal (an RGB signal in this embodiment) to a signal (L*, u*, v*) representing the equivalent coordinates in the color space (CIE 1976 uniform observer color space L*u*v*). The pointed color chromaticity signal setting circuit 2 sets a pointed color chromaticity signal $(u_0^*, v_0^*)$ by, e.g. a key input by an operator. The pointed color chromaticity signal is the color chromaticity signal to which the most prominent adjustment is required and is representing the chromaticity coordinates of the pointed color. The target color chromaticity signal setting circuit 3 sets the chromaticity signal $(u_{0h}^*, v_{0h}^*)$ representing the chromaticity coordinates after the desired color adjustment has been applied to the pointed color. The target color chromaticity signal $(u_{0h}^*, v_{0h}^*)$ is also set by, e.g., a key input by an operator. The color adjustment area setting circuit 4 sets the color adjustment area to which color adjustment is to be applied and the center of which is the pointed color. The characteristics of the first color conversion circuit 5 are defined to convert the entire color plane so that the target color chromaticity signal $(u_{0h}^*, v_{0h}^*)$ results from the pointed color chromaticity signal $(u_0^*, v_0^*)$ based on the output chromaticity signal $(u_0^*, v_0^*)$ of the pointed color chromaticity signal setting circuit 2 and the output chromaticity signal $(u_{0h}^*, v_{0h}^*)$ of the target color chromaticity signal setting circuit 3. The weighting coefficient setting circuit 6 sets the weighting coefficient $\omega$ representing the degree of color adjustment in the color adjustment area set by the color adjustment area setting circuit 4 according to the input chromaticity signal $(u^*, v^*)$. The first color adjustment operating circuit 7 applies the actual color adjustment process to the input chromaticity signal based on the weighting coefficient $\omega$ set by the weighting coefficient setting circuit 6 by applying the chromaticity signal $(u^*, v^*)$ in the output from the color space conversion circuit 1 and the chromaticity signal $(u_h^*, v_h^*)$ output from the first color conversion circuit 5. The color space reconversion circuit 8 converts the color-adjusted signal to a signal of the same format as the input color signal (an RGB signal in this embodiment) based on the output chromaticity signal $(u_c^*, v_c^*)$ of the weighting coefficient setting circuit 6 and the brightness component signal $L^*$ in the output from the color space conversion circuit 1.

Figure 2:
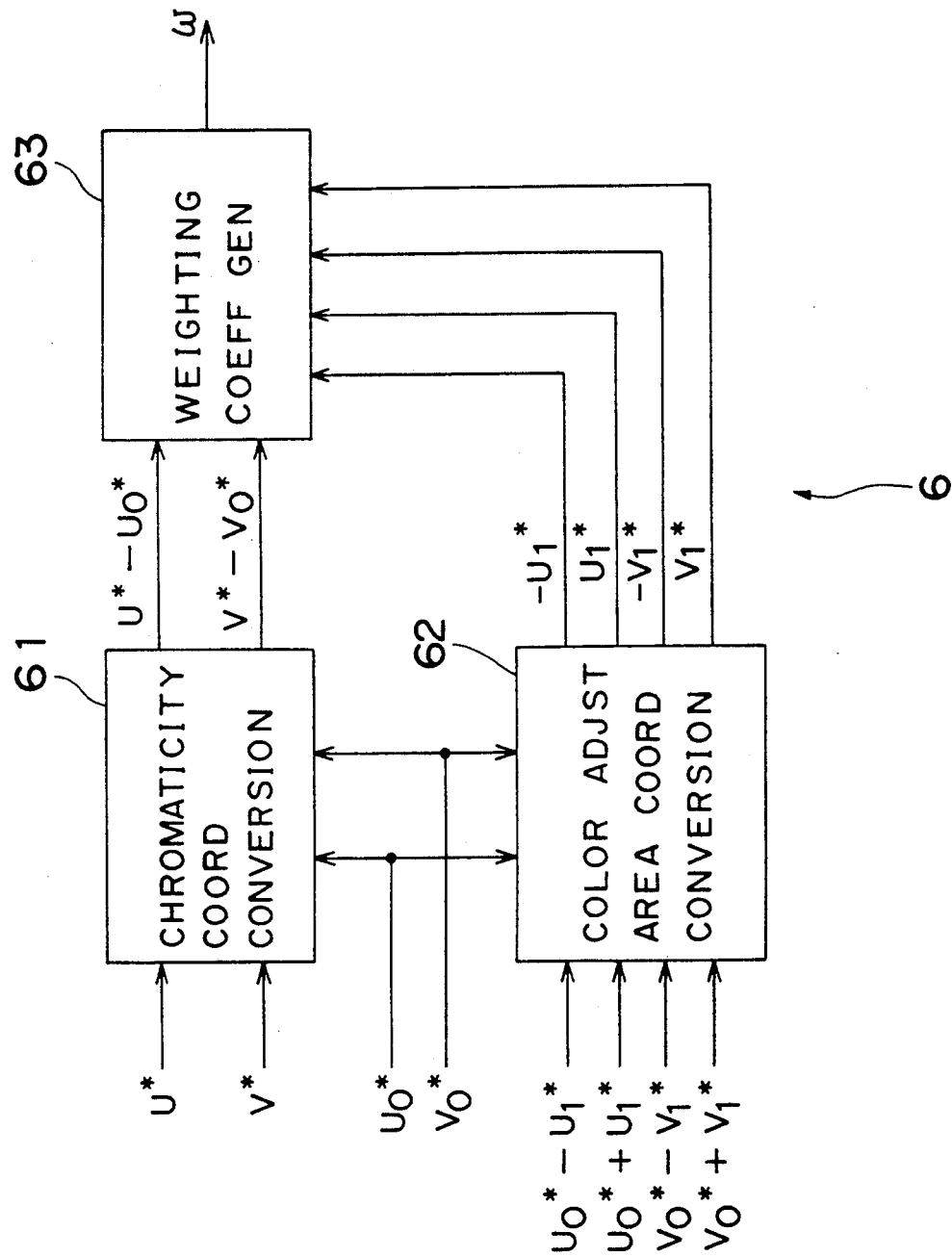
FIG. 2 is a block diagram of the weighting coefficient setting circuit according to the first embodiment of the invention.

FIG. 2 is a block diagram of the weighting coefficient setting circuit 6, which comprises a chromaticity coordinate conversion circuit 61, color adjustment area coordinate conversion circuit 62, and weighting coefficient generating circuit 63.

The chromaticity coordinate conversion circuit 61 converts the coordinates of the chromaticity plane in the uniform observer color space so that the chromaticity coordinates of the pointed color are the origin of the chromaticity plane, and specifically does this by subtracting the pointed color chromaticity signal $(u_0^*, v_0^*)$ from the input chromaticity signal $(u^*, v^*)$. The color adjustment area coordinate conversion circuit 62 similarly converts the coordinates of the color adjustment area $(u_0^* + u_1^*, u_0^* - u_1^*, v_0^* + v_1^*, v_0^* - v_1^*)$ set by the color adjustment area setting circuit 4. The weighting coefficient generating circuit 63 generates the weighting coefficient $\omega$ from the chromaticity signal $(u^* - u_0^*, v^* - v_0^*)$ of the chromaticity coordinate conversion circuit 61 output and the color adjustment area $(u_1^*, -u_1^*, v_1^*, -v_1^*)$ set by the color adjustment area coordinate conversion circuit 62.

Figure 3B:
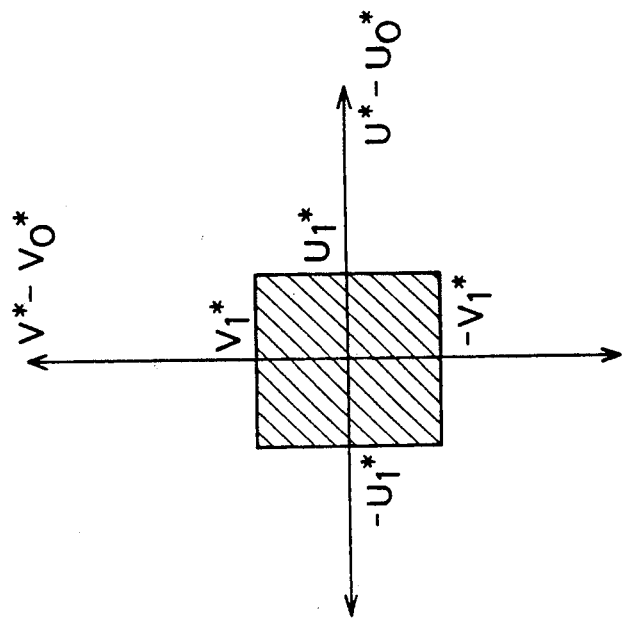
FIGS. 3a and 3b are graphs illustrating the operation of the chromaticity coordinate conversion circuit according to the first embodiment.
Figure 3A:
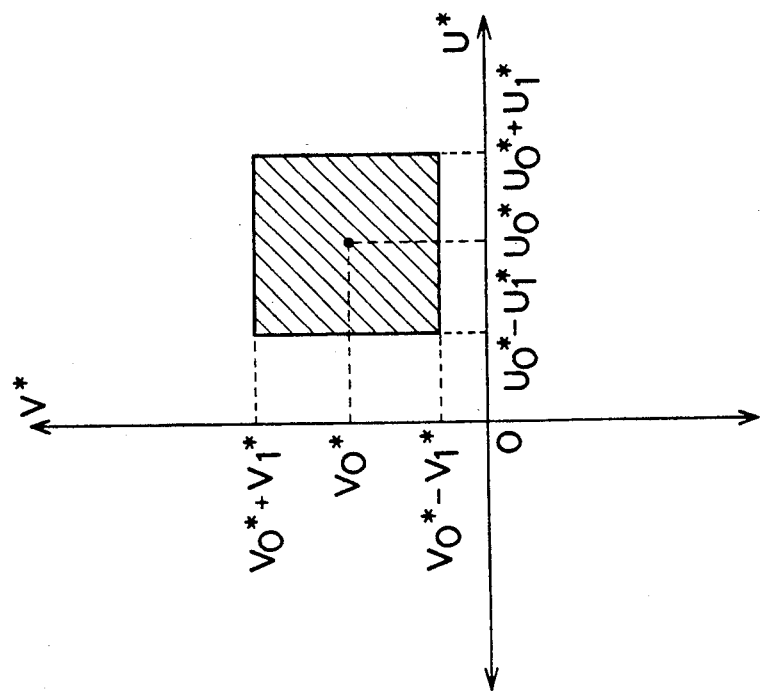

The operation of the chromaticity coordinate conversion circuit 61 and color adjustment area coordinate conversion circuit 62 is illustrated by the graphs in FIGS. 3a and 3b. As shown in FIGS. 3a and 3b, the coordinates are converted so that the chromaticity signal $(u_0^*, v_0^*)$ representing the chromaticity coordinates of the pointed color become the origin of the new coordinate plane. Note that the rectangular shaded area in FIG. 3a indicates the color adjustment area set by the color adjustment area setting circuit 4, and the rectangular shaded area in FIG. 3b indicates the color adjustment area converted by the color adjustment area coordinate conversion circuit 62.

Figure 4:
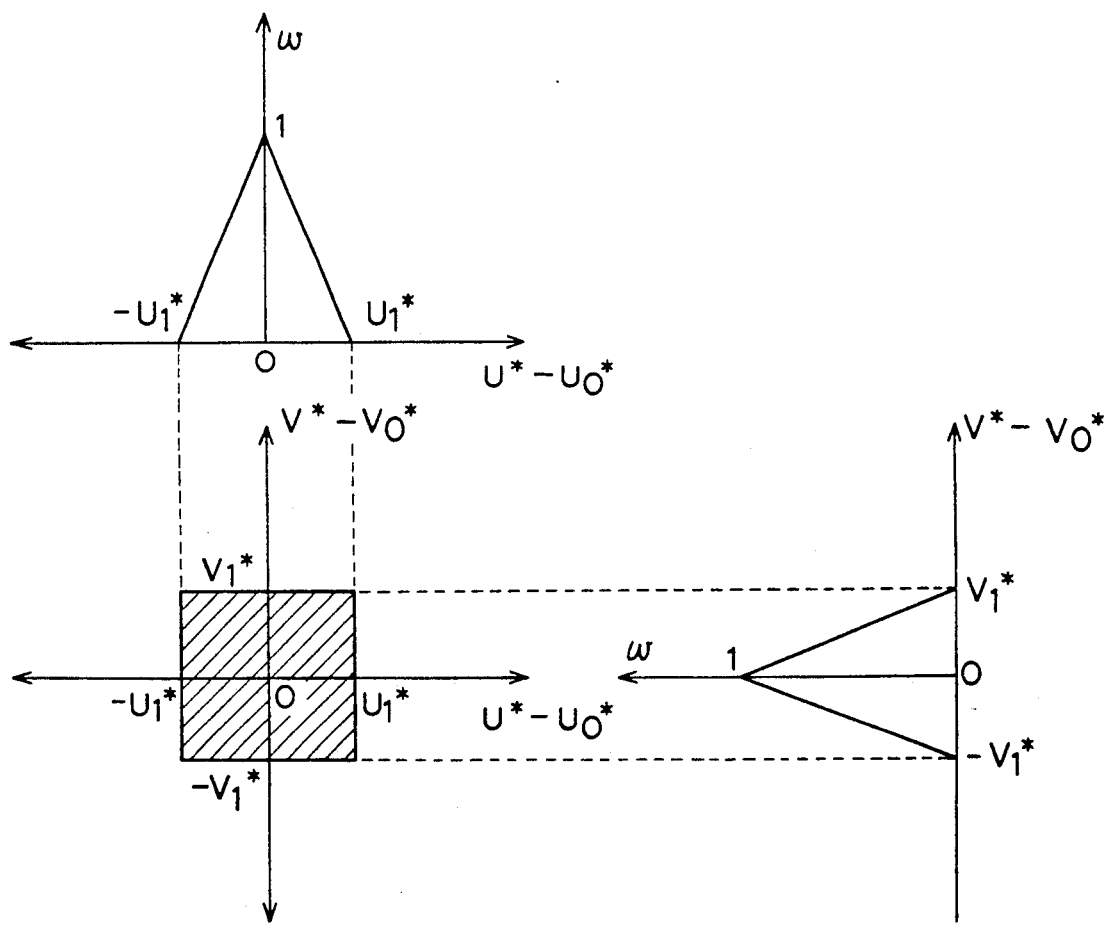
FIG. 4 is a graph of the input/output characteristics of the weighting coefficient setting circuit according to the first embodiment.

The graph in FIG. 4 shows the distribution of the weighting coefficients $\omega$ generated by the weighting coefficient generating circuit 63 on the coordinate plane (FIG. 3b) converted by the chromaticity coordinate conversion circuit 61. The weighting coefficient $\omega$ is set to be greatest ($\omega = 1$) when the chromaticity signal $(u^*, v^*)$ input to the chromaticity coordinate conversion circuit 61 is the origin of the converted coordinates, i.e., when the chromaticity coordinate conversion circuit 61 input is the chromaticity signal $(u_0^*, v_0^*)$ of the pointed color, and continuously decreases to a weighting coefficient ($\omega = 0$) at the boundary of the color adjustment area.

Figure 5:
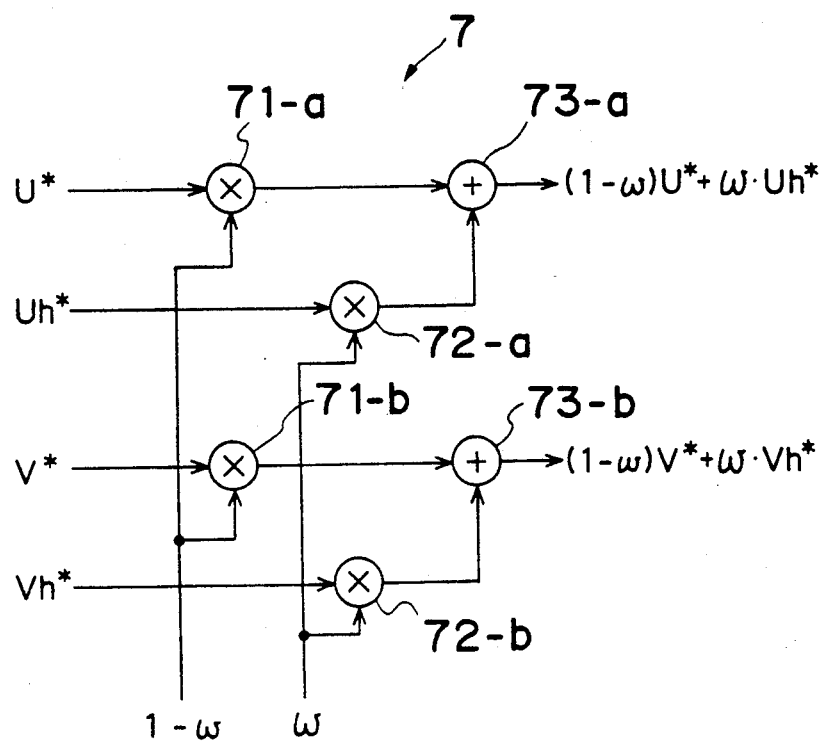
FIG. 5 is a block diagram of the first color adjustment operating circuit 7 according to the first embodiment.

FIG. 5 is a block diagram of the first color adjustment operating circuit 7, which comprises first and second multipliers 71-a and 71-b for multiplying the chromaticity signal $(u^*, v^*)$ in the color space conversion circuit 1 output and the interior division ratio $1-\omega$ of the weighting coefficient, respectively, third and fourth multipliers 72-a and 72-b for multiplying the chromaticity signal $(u_h^*, v_h^*)$ output from the first color conversion circuit 5 and the interior division ratio $\omega$ of the weighting coefficient, respectively, a first adder 73-a for adding the output $((1-\omega) \times u^*)$ of the first multiplier and the output $(\omega \times u_h^*)$ of the third multiplier, and a second adder 73-b for adding the output $((1-\omega) \times v^*)$ of the second multiplier and the output $(\omega \times v_h^*)$ of the fourth multiplier.

Thus, the first color adjustment operating circuit 7 performs an interior division operation on the chromaticity signal $(u^*, v^*)$ in the output of the color space conversion circuit 1 and the chromaticity signal $(u_h^*, v_h^*)$ output from the first color conversion circuit 5 according to the output $\omega$ of the weighting coefficient setting circuit 6. The equation used in this operation is shown in equation (4).

$$u_o^* = (1 - \omega)u^* + \omega \cdot u_h^* \quad (4)$$
$$v_o^* = (1 - \omega)v^* + \omega \cdot v_h^*$$

The operation of the first embodiment is described below with reference to FIGS. 1-5.

Figure 6:
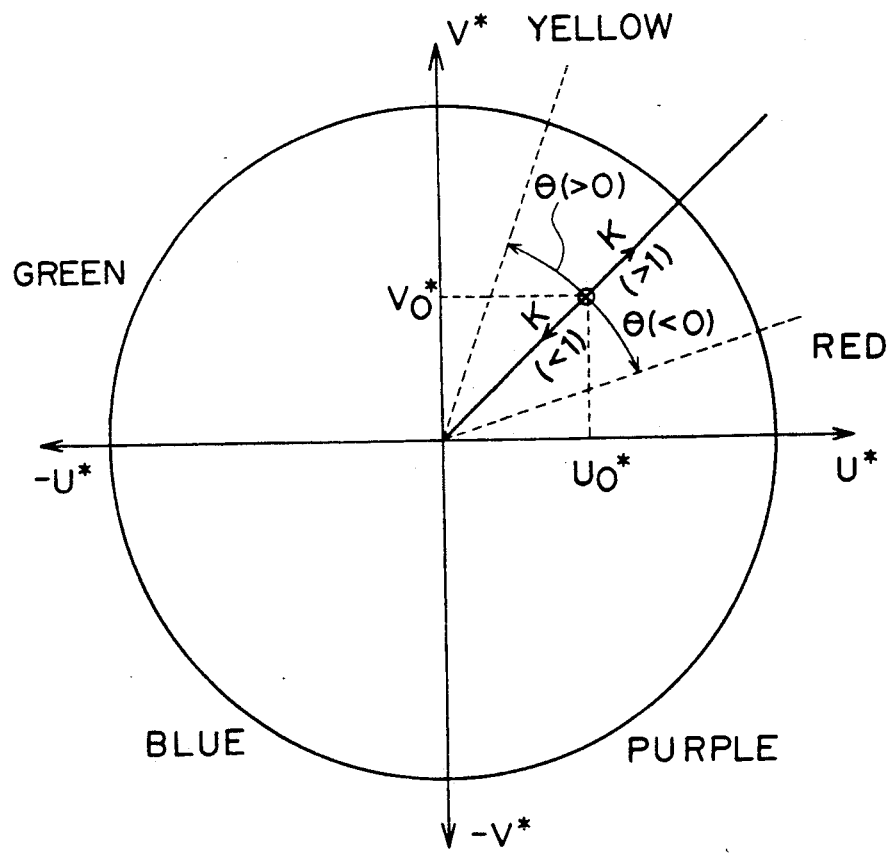
FIG. 6 is a graph illustrating the color adjustment method of the first color adjustment circuit according to the first embodiment.

The input color signal RGB is first converted to a CIE 1976 uniform observer color space $(L^*u^*v^*)$ signal by the color space conversion circuit 1. The equations used for this conversion are shown in equations (5) and (6).

$$X = 0.60699 \times R + 0.17345 \times G + 0.20057 \times B \quad (5)$$
$$Y = 0.29897 \times R + 0.58642 \times G + 0.114612 \times B$$
$$Z = 0.066075 \times G + 1.11585 \times B$$
$$L^* = 116 \times (Y/Y_0)^{1/3} - 16 \quad (6)$$
$$u^* = 13 \times L^* \times (u - u_o)$$
$$v^* = 13 \times L^* \times (v - v_o)$$

in which $u = 4X/(X + 15Y + 3Z)$ $v = 6X/(X + 15Y + 3Z)$ $Y_o = 1, u_o = 0.20089, v_o = 0.30726$ In the CIE 1976 uniform observer color space $(L^*u^*v^*)$, the chromaticness index $(u^*, v^*)$ represents the two elements of the rectangular coordinate system for the plane representing the hue and saturation components. If color adjustment is applied in this plane, it is therefore possible to adjust the hue and saturation while retaining the brightness level. As shown in FIG. 6, when color adjustment is applied while retaining the brightness level, the hue can be changed by rotating ($\theta$ degrees) the color adjustment area based on the origin within the chromaticity plane ($u^*$, $v^*$), and the saturation can be changed by changing the distance from the origin a constant multiple (k times). It is thus possible to adjust the color by means of a linear conversion as shown in equation (7).

$$\begin{pmatrix} u_h^* \\ v_h^* \end{pmatrix} = \begin{pmatrix} k \cdot \cos\theta & k \cdot \sin\theta \\ -k \cdot \sin\theta & k \cdot \cos\theta \end{pmatrix} \begin{pmatrix} u^* \\ v^* \end{pmatrix} \quad (7)$$

As shown in FIG. 6, if k is greater than 1, saturation increases, there is no change in saturation when k=1, and when k is less than 1 saturation decreases. If k =0, the pointed color is the origin on the chromaticity plane, and the image can converted to a monochrome picture.

Furthermore, if the rotation angle $\theta$ is positive, the chromaticity plane rotates counterclockwise and, as shown in FIG. 6, a red color becomes yellowish; if the rotation angle $\theta$ is negative, the chromaticity plane rotates clockwise and a green color becomes yellowish. If the rotation angle $\theta$ is 0, there is no change in the hue. The range for rotation angle $\theta$ is $(-\pi \leq \theta \leq \pi)$.

Next, the first color conversion circuit 5 obtains the result of the linear conversion shown in equation (7) from the chromaticity signal ($u_0^*$,$v_0^*$) of the center of the color area to be adjusted set by the pointed color chromaticity signal setting circuit 2 and the chromaticity signal ($u_{0h}^*$,$v_{0h}^*$) of the color to which the pointed color is to be converted by the target color chromaticity signal setting circuit 3. This linear conversion results in the entire chromaticity plane being converted.

Operation of the color adjustment area setting circuit 4 is described below. In general the color adjustment area is a fan-shaped area as described with respect to the prior art above, but the area to which adjustment is applied must be very small using the conventional method because of the need to maintain color continuity. Thus, this color adjustment area can be a rectangular area if it is small enough, and if the color adjustment area is rectangular polar coordinate conversion of the input chromaticity signal ($u^*$, $v^*$) is not necessary and the circuit construction can thus be simplified. As a result, the area determined by the color adjustment area setting circuit 4 in this invention is a rectangular area of which the center is the chromaticity coordinates ($u_0^*$, $v_0^*$) of the pointed color.

The weighting coefficient setting circuit 6 then determines the weighting coefficient $\omega$ according to the distance of the chromaticity signal ($u^*$, $v^*$) representing the chromaticity coordinates of the input color from the chromaticity signal ($u_0^*$, $v_0^*$) representing the chromaticity coordinates of the pointed color on the chromaticity plane. The operation of the weighting coefficient setting circuit 6 is described in further detail with reference to FIGS. 2-4.

The chromaticity signal ($u^*$, $v^*$) input to the weighting coefficient setting circuit 6 is first converted by the chromaticity coordinate conversion circuit 61 so that the chromaticity signal ($u_0^*$, $v_0^*$) representing the chromaticity coordinates of the pointed color become the origin of the color adjustment area as shown in FIG. 3. This conversion is performed because it is not necessary to change the contents of the weighting coefficient generating circuit 63 if only the pointed color is changed and the color adjustment area is not changed, and because the circuit construction is simpler.

The input/output characteristics of the weighting coefficient generating circuit 63 are next obtained based on the coordinate-converted color adjustment area ($u_1^*$, $-u_1^*$, $v_1^*$, $-v_1^*$) (the shaded area in FIG. 4 (b)) output by the color adjustment area coordinate conversion circuit 62 based on the color adjustment area ($u_0^*+u_1^*$, $u_0^*-u_1^*$, $v_0^*+v_1^*$, $v_0^*-v_1^*$) set by the color adjustment area setting circuit 4. The weighting coefficient $\omega$ is set to be greatest (w=1) at the origin of the coordinate converted plane, i.e., when the pointed color is the target color, and continuously decreases to a weighting coefficient ($\omega=0$) at the boundary of the color adjustment area. This weighting coefficient generating circuit 63 can be easily constructed using a look-up table.

Thus, based on the weighting coefficient $\omega$ set by the weighting coefficient setting circuit 6, the first color adjustment operating circuit 7 obtains the color adjusted chromaticity signal ($u_c^*$, $v_c^*$) from an interior division operation, equation (4), based on the chromaticity signal ($u^*$, $v^*$) in the color space conversion circuit 1 output and the chromaticity signal ($u_h^*$, $v_h^*$) of the first color conversion circuit 5 output.

Figure 7:
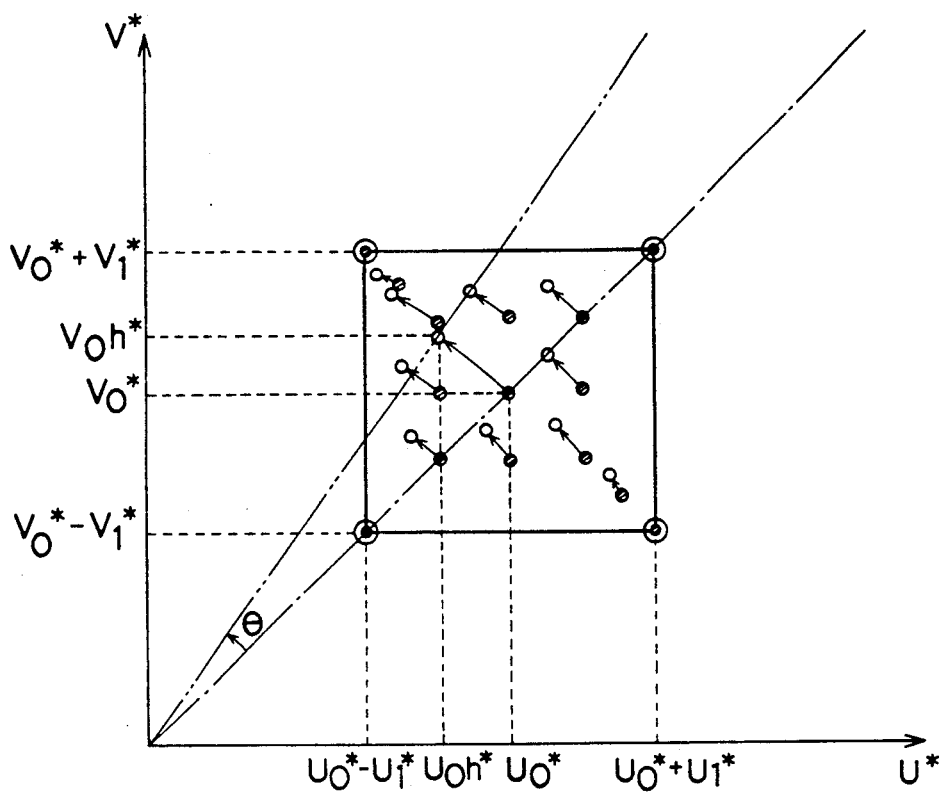
FIG. 7 is a graph illustrating the color adjustment method of the first color adjustment circuit according to the first embodiment.

An example of this color adjustment operation is shown in FIG. 7. In this example the saturation is not adjusted, the hue is adjusted by $+\theta$ degree rotation, and the input/output characteristics of the weighting coefficient generating circuit 63 are as shown in FIG. 4. The linear conversion defined in equation (7) can be restated as equation (8) for this operation.

$$\begin{pmatrix} u_h^* \\ v_h^* \end{pmatrix} = \begin{pmatrix} \cos\theta & \sin\theta \\ -\sin\theta & \cos\theta \end{pmatrix} \begin{pmatrix} u^* \\ v^* \end{pmatrix} \quad (8)$$

As shown in FIG. 7, the chromaticity coordinates after color adjustment of the pointed color are changed to calculated chromaticity coordinates based on equation (8), resulting in less change at any given coordinates the farther the coordinates are from the pointed color until there is no change (0) in the coordinates at the boundarys of the color adjustment area. Furthermore, because color adjustment is applied to colors both inside and outside the area, color inversion does not result.

By then converting the chromaticity signal ($u_c^*$, $v_c^*$) output from the first color adjustment operating circuit 7 to an RGB signal using the L* signal representing the brightness component in the output from the color space conversion circuit 1, the color adjusted color signal is obtained by the color space reconversion circuit 8 in the same format as the initial input signal.

It is to be noted that the present invention was described with the color space conversion circuit 1 converting the input color signal to a CIE 1976 uniform observer color space (L*u*v*), but the same effect can be obtained with the same construction when the input color signal is converted to a CIE 1976 uniform observer color space (L*a*b*), or using color brightness difference signals (e.g., R-Y, B-Y signals), or other color expressions.

It is also to be noted that a chromaticity coordinate conversion circuit 61 and color adjustment area coordinate conversion circuit 62 using the chromaticity signal of the pointed color as the origin to generate the weighting coefficient ω were provided in the weighting coefficient setting circuit 6, but the same effect can be obtained on the chromaticity plane without coordinate conversion.

As described hereinabove, selective color adjustment retaining color continuity and without inversion of colors inside and outside the color adjustment area is made possible by operating on a chromaticity plane representing the hue and saturation components of color, setting the characteristics of the first color conversion circuit to convert the entire plane so that the pointed color is converted to the target color from the pointed color chromaticity signal representing the median of the color area to be converted and set by the pointed color chromaticity signal setting circuit, and the target color chromaticity signal representing the desired color after conversion is completed and set by the target color chromaticity signal setting circuit, setting a weighting coefficient by means of a weighting coefficient setting circuit according to the input chromaticity signal and the pointed color chromaticity signal set by the pointed color chromaticity signal setting circuit, and setting the output chromaticity signal according to the output of the weighting coefficient setting circuit based on the output chromaticity signal of the first color conversion circuit and the input chromaticity signal.

In addition, this embodiment of the invention can be simply constructed on a small-scale circuit device because complex non-linear processing to convert the color expressions to a different polar coordinate system is not required.

In addition, this color adjustment process can be completed with a relatively small bit capacity because non-linear conversion is used only for the color space conversion. If the color space converted by the color space conversion circuit is represented by color brightness difference signals, the need for any non-linear operations is eliminated and the color adjustment process can be made even smaller with real-time processing capabilities.

An alternative embodiment of the invention is described below.

Figure 8:
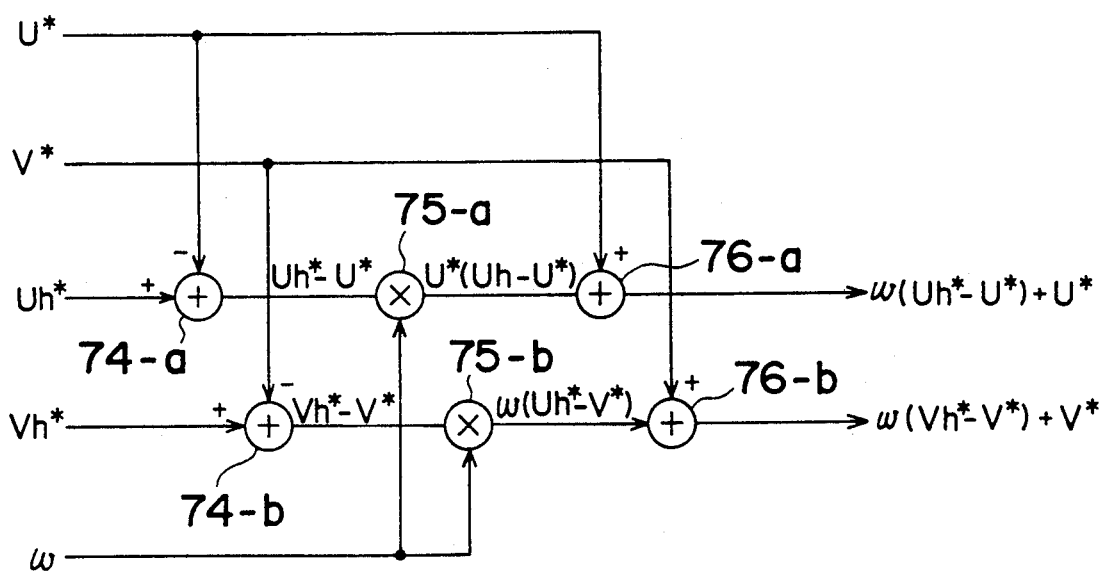
FIG. 8 is a block diagram of the color adjustment operating circuit of a color adjustment apparatus according to a second embodiment of the invention.

This alternative embodiment is comprised of the same elements shown in FIG. 1 except that the first color adjustment operating circuit 7 is comprised as shown in FIG. 8. The construction and operation of this embodiment is the same as that of the first embodiment with the exception of the first color adjustment operating circuit 7. Further description of like parts is therefore omitted, and only the construction and operation of the first color adjustment operating circuit 7 are described below.

FIG. 8 is a block diagram of the first color adjustment operating circuit 7 according to this alternative embodiment. This first color adjustment operating circuit 7 comprises first and second subtracting circuit 74-a and 74-b to subtract the chromaticity signal ($u^*$, $v^*$) components of the color space conversion circuit 1 output from the chromaticity signal ($u_h^*$, $v_h^*$) components of the first color conversion circuit 5 output, fifth and sixth multipliers 75-a and 75-b for multiplying the weighting coefficient ω by the outputs from the first and second subtracting circuits 74-a and 74-b, and third and fourth adders 76-a and 76-b for adding the chromaticity signal ($u^*$, $v^*$) component of the color space conversion circuit 1 output to the output of the fifth and sixth multipliers 75-a and 75-b, respectively.

The first color adjustment operating circuit 7 operates as follows.

The chromaticity signal ($u^*$, $v^*$) components ($u^*$) and ($v^*$) in the output of the color space conversion circuit 1 are respectively subtracted from the chromaticity signal components ($u_h^*$) and ($v_h^*$) of the first color conversion circuit 5 output, and the results are multiplied by the weighting coefficient ω set by the weighting coefficient setting circuit 6. These products are then added to the respective input chromaticity signal ($u^*$, $v^*$) components, and an interior division operation with the input chromaticity signal ($u^*$, $v^*$) is performed with the interior division ratio defined by the weighting coefficient ω. The resulting output chromaticity signal is then reconverted to a source signal format color signal to complete the selective color adjustment process.

By subtracting the chromaticity signal ($u^*$, $v^*$) component of the color space conversion circuit 1 output from the chromaticity signal ($u_h^*$, $v_h^*$) of the first color conversion circuit 5 output by means of first and second subtracting circuit 74-a and 74-b, multiplying the outputs from the first and second subtracting circuit 74-a and 74-b by the weighting coefficient ω by means of the fifth and sixth multipliers 75-a and 75-b, and adding the chromaticity signal ($u^*$, $v^*$) component of the color space conversion circuit 1 output to the output of the fifth and sixth multipliers 75-a and 75-b by means of third and fourth adders 76-a and 76-b in this embodiment of the invention, the number of multipliers and the scale of the circuit can be reduced, and excellent practical effectiveness is obtained even when constructed with a low operating precision analog processor because there is little effect on the operation result.

An alternative embodiment of the invention is described below.

Figure 9:
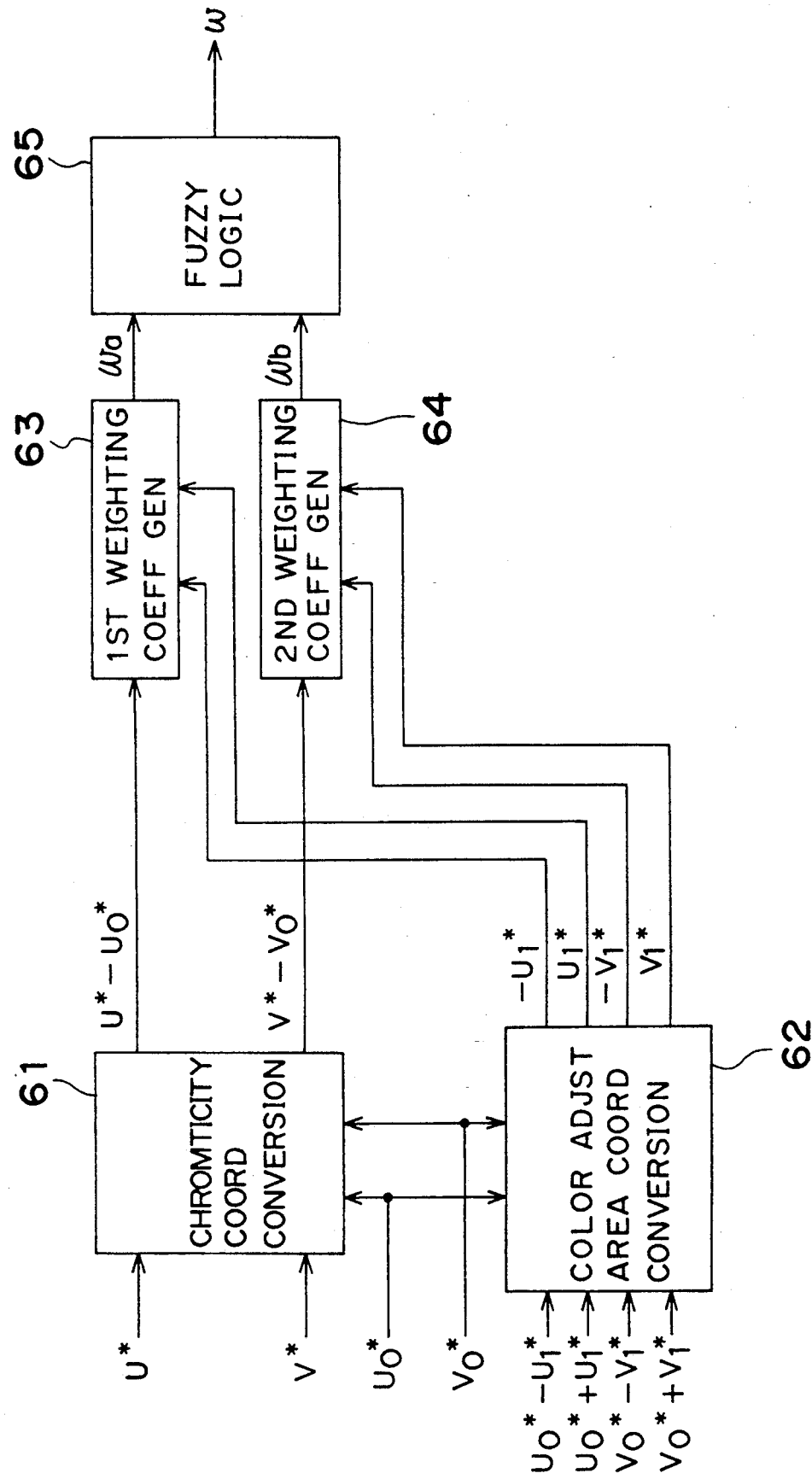
FIG. 9 is a block diagram of the weighting coefficient setting circuit in a color adjustment apparatus according to the third embodiment of the invention.

This alternative embodiment is comprised of the same elements shown in FIG. 1 except that the weighting coefficient setting circuit 6 is comprised as shown in FIG. 9. The construction and operation of this embodiment is the same as that of the first embodiment with the exception of the weighting coefficient setting circuit 6. Further description of like parts is therefore omitted, and only the construction and operation of the weighting coefficient setting circuit 6 are described below.

Figure 10A:
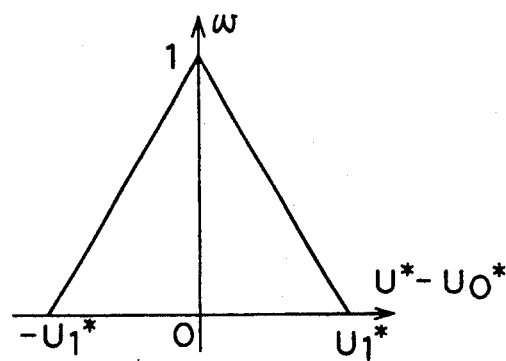
FIGS. 10a, 10b and 10c are graphs illustrating the operation of the weighting coefficient setting circuit according to the third embodiment of the invention.
Figure 10B:
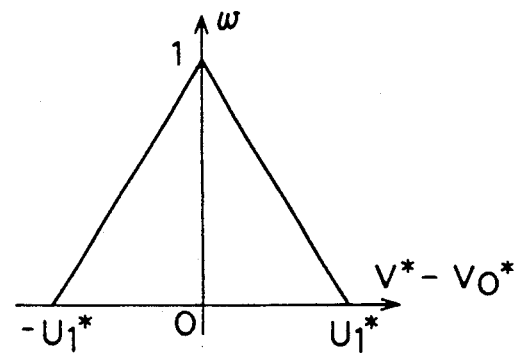
Figure 10C:
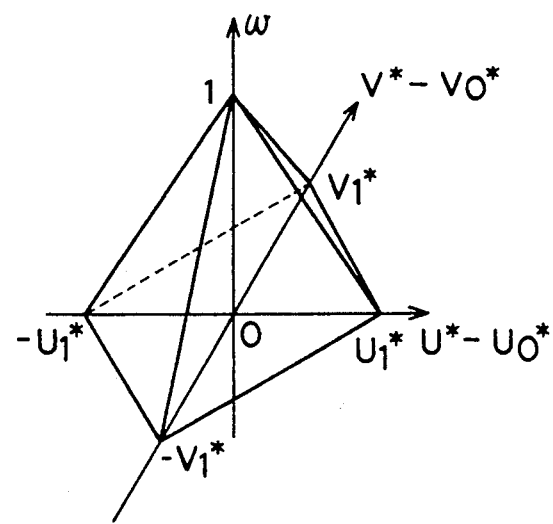

FIGS. 10a, 10b and 10c show graphs describing the operation of the weighting coefficient setting circuit 6.

As shown in the block diagram in FIG. 9, this weighting coefficient setting circuit 6 comprises a chromaticity coordinate conversion circuit 61, color adjustment area coordinate conversion circuit 62, first weighting coefficient generating circuit 63, second weighting coefficient generating circuit 64, and a fuzzy logic multiplying circuit 65.

The chromaticity coordinate conversion circuit 61 converts the coordinates of the chromaticity plane so that the chromaticity signal ($u_0^*$, $v_0^*$) representing the chromaticity coordinates of the pointed color in the chromaticity signal ($u^*$, $v^*$) are the origin of the chromaticity coordinates. The color adjustment area coordinate conversion circuit 62 similarly converts the coordinates of the color adjustment area ($u_0^* + u_1$, $u_0^* - u_1^*$, $v_0^* + v_1^*$, $v_0^* - v_1^*$) set by the color adjustment area setting circuit 4. The first weighting coefficient generating circuit 63 generates the weighting coefficient $\omega_a$ shown in FIG. 10a from the output ($u^* - u_0^*$) from the color space conversion circuit 1 based on the color adjustment area ($u_1^*$, $-u_1^*$) converted by the color adjustment area coordinate conversion circuit 62. The second weighting coefficient generating circuit 64 generates the weighting coefficient $\omega_b$ shown in FIG. 10b from the output ($v^* - v_0^*$) from the color space conversion circuit 1 based on the color adjustment area ($v_1^*$, $-v_1^*$) converted by the color adjustment area coordinate conversion circuit 62. The fuzzy logic multiplying circuit 65 obtains the fuzzy logic product by applying the min operation shown in equation (9) based on the weighting coefficients $\omega_a$ and $\omega_b$ output from the first and second weighting coefficient generating circuit 63 and 64, respectively.

$$\omega_a \odot \omega_b = \min\{\omega_a, \omega_b\} \qquad (9)$$
$$= \omega_a \wedge \omega_b$$

The operation of this embodiment is described briefly below because of the similarities to the first embodiment described above.

The input color signal RGB is first converted to a CIE 1976 uniform observer color space ($L^*u^*v^*$) signal by the color space conversion circuit 1. The linear conversion adjusting the input color to the desired color on the chromaticity plane to be adjusted is obtained, and the first color conversion circuit 5 applies a linear conversion to the input chromaticity signal ($u^*$, $v^*$) to obtain the chromaticity signal ($u_h^*$, $v_h^*$) after this linear conversion.

The chromaticity signal ($u^*$, $v^*$) input to the weighting coefficient setting circuit 6 is first converted by the chromaticity coordinate conversion circuit 61 so that the chromaticity signal ($u_0^*$, $v_0^*$) of the pointed color is the origin of the color adjustment area. Based on the coordinate-converted color adjustment area ($u_1^*$, $-u_1^*$, $v_1^*$, $-v_1^*$) output by the color adjustment area coordinate conversion circuit 62 based on the color adjustment area ($u_0^* + u_1^*$, $u_0^* - u_1^*$, $v_0^* + v_1^*$, $v_0^* - v_1^*$) set by the color adjustment area setting circuit 4, the first weighting coefficient generating circuit 63 outputs a weighting coefficient $\omega_a$ such as that shown in FIG. 10a based on the input ($u^* - u_0^*$) output from the chromaticity coordinate conversion circuit 61, and the second weighting coefficient generating circuit 64 outputs a weighting coefficient $\omega_b$ such as that shown in FIG. 10b based on the input ($v^* - v_0^*$) output from the chromaticity coordinate conversion circuit 61. The fuzzy logic multiplying circuit 65 then performs a fuzzy logic operation to obtain the fuzzy logic product as the min of the weighting coefficients $\omega_a$ and $\omega_b$ generated for the respective input signals ($u^* - u_0^*$) and ($v^* - v_0^*$), and outputs the resulting weighting coefficient $\omega$ shown in FIG. 10c.

The color adjusted chromaticity signal ($u_c^*$, $v_c^*$) is then obtained from the interior division operation shown in equation (4) by the first color adjustment operating circuit 7 from the chromaticity output ($u^*$, $v^*$) of the color space conversion circuit 1 and the first color conversion circuit 5 output ($u_h^*$, $v_h^*$) by applying the weighting coefficient $\omega$ thus set by the weighting coefficient setting circuit 6.

By then converting the chromaticity signal ($u_c^*$, $v_c^*$) output from the first color adjustment operating circuit 7 to an RGB signal using the $L^*$ signal representing the brightness component in the output from the color space conversion circuit 1, the color adjusted color signal is obtained by the color space reconversion circuit 8 in the same format as the initial input signal.

With this embodiment, a linear relationship between the input/output characteristics of the weighting coefficient setting circuit can be established by providing two weighting coefficient setting circuit to set a separate weighting coefficient for each component of a chromaticity signal that is input to the weighting coefficient setting circuit and represents the two elements of the rectangular coordinate system for the plane of hue and saturation values, and a fuzzy logic multiplying circuit to generate the weighting coefficient from the fuzzy logic product of the two weighting coefficient setting circuit outputs. It is to be noted that the value of the weighting coefficient is one on the chromaticity signal component axis, and decreases continuously in relation to the distance from the axis to zero at a boundary parallel to each axis of the color adjustment area set by the color adjustment area setting circuit. Furthermore, the input/output characteristics can be determined more easily because of the simple construction of the fuzzy logic multiplying circuit.

An alternative embodiment of the invention is described below.

FIG. 11 is a block diagram of a color adjustment apparatus according to this alternative embodiment of the invention. Referring to FIG. 11, the color space conversion circuit 1 converts the input trichromatic color signal (an RGB signal in this embodiment) to a chromaticity signal ($u^*$, $v^*$) representing the hue and saturation coordinates on the rectangular coordinate plane of hue and saturation values in a uniform color space (CIE 1976 uniform observer color space ($L^*u^*v^*$) in this embodiment). The pointed color color signal setting circuit 9 sets the trichromatic color signal ($R_0$, $G_0$, $B_0$) of the pointed color at the middle of the color area to be changed by the color adjustment process. The target color color signal setting circuit 10 sets the trichromatic color signal ($R_{0h}$, $G_{0h}$, $B_{0h}$) after the desired color adjustment has been applied to the pointed color. The color adjustment area setting circuit 4 sets the color adjustment area to which color adjustment is to be applied and the median color of which is the pointed color. The color adjustment area set by the color adjustment area setting circuit 4 is set on the same plane of hue and saturation component values. The second color conversion circuit 11 converts the entire color space so that the pointed color color signal ($R_0$, $G_0$, $B_0$) is converted to the target color color signal ($R_0$, $G_0$, $B_{0h}$) based on the trichromatic color signal ($R_0$, $G_{0h}$, $B_{0h}$) set by the pointed color color signal setting circuit 9 and the trichromatic color signal ($R_{0h}$, $G_{0h}$, $B_{0h}$) set by the target color color signal setting circuit 10.

The weighting coefficient setting circuit 6 sets the weighting coefficient $\omega$ representing the degree of color adjustment in the color adjustment area set by the color adjustment area setting circuit 4 according to the chromaticity signal ($u^*$, $v^*$) obtained by the color space conversion circuit 1 from the input trichromatic color signal (RGB). The second color adjustment operating circuit 12 applies color adjustment processing to the input RGB color signal according to the weighting coefficient ω set by the weighting coefficient setting circuit 6 according to the input RGB color signal and the output color signal ($R_h$, $G_h$, $B_h$) of the second color conversion circuit 11, and outputs the color-adjusted trichromatic color signal ($R_c$, $G_c$, $B_c$).

The construction of the weighting coefficient setting circuit 6 shown in FIG. 11 is the same as that shown in FIG. 2, and comprises a chromaticity coordinate conversion circuit 61 for converting the chromaticity coordinates of the pointed color to the origin of the chromaticity plane, a color adjustment area coordinate conversion circuit 62 for converting the coordinates of the color adjustment area ($u_0^* + u_1^*$, $u_0^* - u_1^*$, $v_0^* + v_1^*$, $v_0^* - v_1^*$) set by the color adjustment area setting circuit 4, and a weighting coefficient generating circuit 63 for generating the weighting coefficient ω from the chromaticity signal ($u^* - u_0^*$, $v^* - v_0^*$) of the chromaticity coordinate conversion circuit 61 output and the color adjustment area ($u_1^*$, $-u_1^*$, $v_1^*$, $-v_1^*$) set by the color adjustment area coordinate conversion circuit 62. The operation of the chromaticity coordinate conversion circuit 61 and the color adjustment area coordinate conversion circuit 62 are the same as in the first embodiment described above.

The distribution of weighting coefficients ω output by the weighting coefficient generating circuit 63 on the coordinate system converted by the chromaticity coordinate conversion circuit 61 is the same as that shown in FIG. 4. Specifically, the weighting coefficient is greatest ($ω=1$) when the chromaticity signal ($u^*$, $v^*$) input to the chromaticity coordinate conversion circuit 61 is the origin of the converted coordinates, i.e., when the chromaticity coordinate conversion circuit 61 input is the chromaticity signal ($u_0^*$, $v_0^*$) of the pointed color, and continuously decreases to a weighting coefficient ($ω=0$) at the boundary of the color adjustment area.

Figure 12:
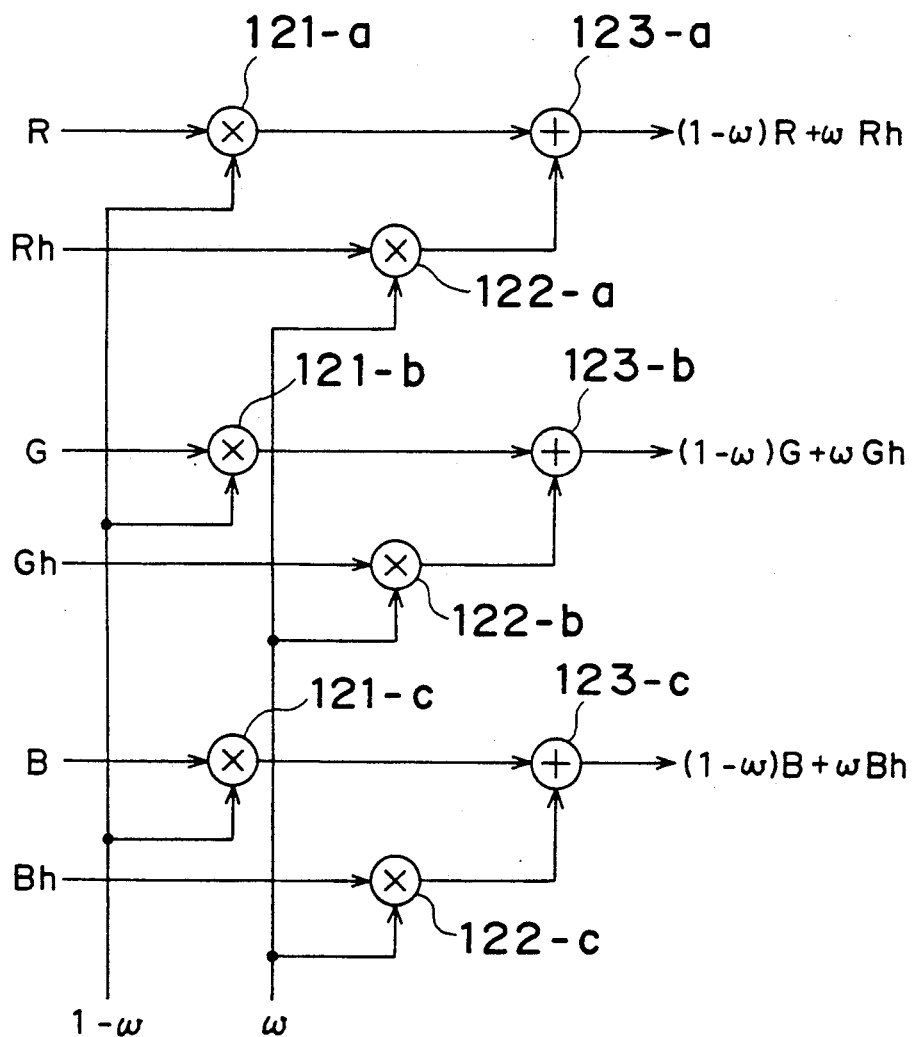
FIG. 12 is a block diagram of the second color adjustment operating circuit according to a fourth embodiment of the invention.

FIG. 12 is a block diagram of the second color adjustment operating circuit 12. As shown in FIG. 12, the second color adjustment operating circuit 12 comprises first, second, and third multipliers 121-a, 121-b, and 121-c for multiplying the interior division ratio ($1-ω$) of the weighting coefficient by the three components (R, G, and B) of the input trichromatic color signal, respectively; fourth, fifth, and sixth multipliers 122-a, 122-b, and 122-c for multiplying the interior division ratio ω of the weighting coefficient by the three components ($R_h$, $G_h$, and $B_h$) of the second color conversion circuit 11 output, respectively; a first adder 123-a for adding the products of the first multiplier ($(1-ω) \times R$) and the fourth multiplier ($ω \times R_h$); a second adder 123-b for adding the products of the second multiplier ($(1-ω) \times G$) and the fifth multiplier ($ω \times G_h$); and a third adder 123-c for adding the products of the third multiplier ($(1-ω) \times B$) and the sixth multiplier ($ω \times B_h$).

Thus, the second color adjustment operating circuit 12 performs an interior division operation on the input trichromatic color signal (R, G, B) and the output color signal ($R_h$, $G_h$, $B_h$) from the second color conversion circuit 11 by applying the output of the weighting coefficient setting circuit 6. This operation is shown in equation (10).

$$Rc = (1 - ω) \times R + ωR_h$$
$$Gc = (1 - ω) \times G + ωG_h$$
$$Bc = (1 - ω) \times B + ωB_h$$
(10)

The operation of this alternative embodiment is described below with reference to FIGS. 11 and 12.

The input trichromatic color signal (R, G, B) is first converted by the color space conversion circuit 1 as in the first embodiment to obtain the chromaticity signal ($u^*$, $v^*$) representing the two elements of the rectangular coordinate system for the plane representing the hue and saturation components in the CIE 1976 uniform observer color space ($L^* u^* v^*$).

The coordinates of the chromaticity plane set by the color adjustment area setting circuit 4 can be easily set because the chromaticity signal ($u_0^*$, $v_0^*$) of the pointed color can be easily obtained from the chromaticity signal at the middle of the color adjustment area, i.e., the trichromatic color signal ($R_0$, $G_0$, $B_0$) of the pointed color set by the pointed color color signal setting circuit 9, by applying equation (5) and equation (6).

The second color conversion circuit 11 obtains the result of the linear conversion shown in equation (11) from the pointed color color signal ($R_0$, $G_0$, $B_0$) set by the pointed color color signal setting circuit 9 at the middle of the color adjustment area and the color signal ($R_{0h}$, $G_{0h}$, $B_{0h}$) of the color set by the target color color signal setting circuit 10 to which the pointed color is to be changed after color adjustment.

$$\begin{pmatrix} R_h \\ G_h \\ B_h \end{pmatrix} = \begin{pmatrix} a11 & a12 & a13 \\ a21 & a22 & a23 \\ a31 & a32 & a33 \end{pmatrix} \begin{pmatrix} R \\ G \\ B \end{pmatrix}$$
(11)

It is to be noted that the sum of each line in the linear conversion matrix shown in equation (11) is obtained to be 1 so that the brightness of the output trichromatic color signal is equal to the brightness of the input signal.

Note also that the color adjustment area set by the color adjustment area setting circuit 4 is the same as that of the first embodiment shown in FIG. 3.

Furthermore, the weighting coefficient ω is set by the weighting coefficient setting circuit 6 according to the distance of the chromaticity signal ($u_0^*$, $v_0^*$) representing the chromaticity coordinates of the pointed color on the chromaticity plane from the chromaticity signal ($u^*$, $v^*$) representing the chromaticity coordinates obtained by the color space conversion circuit 1 from the input trichromatic color signal (R, G, B).

Further description of weighting coefficient setting circuit 6 operation is omitted because it is the same as that in the first embodiment. The color-adjusted trichromatic color signal ($R_c$, $G_c$, $B_c$) is obtained from the trichromatic color input signal (R, G, B) and the second color conversion circuit 11 output signal ($R_h$, $G_h$, $B_h$) by the second color adjustment operating circuit 12 by performing the interior division operation shown in equation (10) using the weighting coefficient ω output by the weighting coefficient setting circuit 6.

It is to be noted that the present invention was described with the color space conversion circuit 1 converting the trichromatic color input signal (R, G, B) to a chromaticity signal ($u^*$, $v^*$) in the CIE 1976 uniform observer color space ($L^* u^* v^*$), but the same effect can be obtained with the same construction when the input color signal is converted to an ($a^*$, $b^*$) chromaticity signal in CIE 1976 uniform observer color space ($L^* a^* b^*$), or using color brightness difference signals (e.g., R-Y, B-Y signals), or other color expressions.

It is also to be noted that a chromaticity coordinate conversion circuit 61 and color adjustment area coordinate conversion circuit 62 using the chromaticity signal of the pointed color as the origin to generate the weighting coefficient ω were provided in the weighting coefficient setting circuit 6, but the same effect can be obtained on the chromaticity plane without coordinate conversion.

As described hereinabove, selective color adjustment retaining color continuity and without inversion of colors inside and outside the color adjustment area is made possible by setting a weighting coefficient by means of a weighting coefficient setting circuit according to the distance on the chromaticity plane representing the hue and saturation components of color between the chromaticity signal obtained from the trichromatic pointed color signal set by the pointed color color signal setting circuit at the middle of the color adjustment area, and the chromaticity signal of the input trichromatic color signal obtained from the color space conversion circuit, and setting the trichromatic color output signal according to the output of the weighting coefficient setting circuit based on the input trichromatic color signal and the output of the color conversion circuit. Note that the input/output characteristics of the color conversion circuit have been set to convert the trichromatic color signal of the pointed color to the trichromatic color signal of the target color achieved after color conversion and set by the target color color signal setting circuit.

In addition, this embodiment of the invention can be simply constructed on a small-scale circuit because complex non-linear processing to convert the color expressions to a different polar coordinate system is not required. This color adjustment process can also be completed with a device having a relatively small bit capacity because non-linear conversion is used only for the color space conversion.

Furthermore, if the color space conversion circuit outputs color brightness difference signals (R-Y, B-Y) from the trichromatic color input signal (R, G, B), the need for any non-linear operation is eliminated and the color adjustment process can be made even smaller with real-time processing capabilities.

In addition, the second color conversion circuit 11 performs a three row, three column matrix operation in which the sum of each row equals 1 to preserve the same white balance in the input and output signals, but selective brightness adjustment can also be applied if the sum of each row is set to a value k where (0<k). This is because the brightness index L* representing the brightness component in equation (6) is fixed as Y in equation (5), and by increasing the color signal (R, G, B) k times, the value Y is also increased k times. Thus, if k<1, the brightness decreases, brightness remains unchanged when k=1, and brightness increases when k>1.

Thus, if the trichromatic color signal output from the second color conversion circuit 11 is (Rk$_h$, Gk$_h$, Bk$_h$), equation (10) can be rewritten as equation (12). When ω=1, i.e., when the input color signal (R, G, B) is the trichromatic color signal of the pointed color, the trichromatic color signal after color adjustment will be (Rk$_h$, Gk$_h$, Bk$_h$), the trichromatic color input signal with brightness increased k times. When ω=0, i.e., when the input color signal (R, G, B) is on the boundary of the color adjustment area, output of the second color adjustment operating circuit 12 will be the input color signal (R, G, B).

$$Rc = (1 - \omega) \times R + \omega Rk_h \quad (12)$$
$$Gc = (1 - \omega) \times G + \omega Gk_h$$
$$Bc = (1 - \omega) \times B + \omega Bk_h$$

Figure 13:
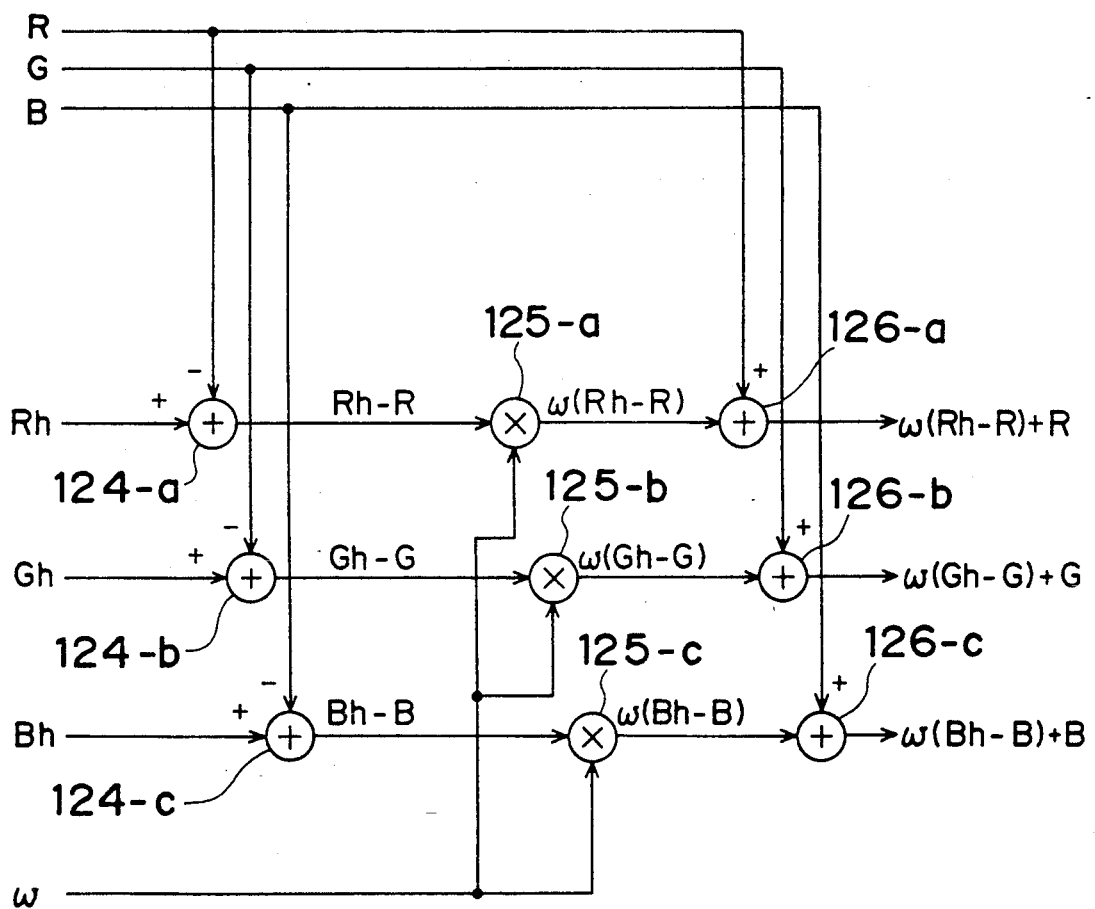
FIG. 13 is a block diagram of the second color adjustment operating circuit in a color adjustment apparatus according to a fifth embodiment of the invention.

A further alternative embodiment of the invention is described below. This embodiment is similar in construction the embodiment shown in FIG. 11 except that the second color adjustment operating circuit 12 is constructed as shown in FIG. 13. With the exception of the second color adjustment operating circuit 12, the operation of this embodiment of the invention is the same as that of the first alternative embodiment described above. Further description of like operations is therefore omitted, and only the operation and construction of the second color adjustment operating circuit 12 are described below.

FIG. 13 is a block diagram of the second color adjustment operating circuit 12. As shown in FIG. 13, the second color adjustment operating circuit 12 comprises first, second, and third subtracting circuit 124-a, 124-b, and 124-c for subtracting the three components (R, G, and B) of the trichromatic color input signal from the three components (R$_h$, G$_h$, B$_h$) of the second color conversion circuit 11 output; seventh, eighth, and ninth multipliers 125-a, 125-b, and 125-c for multiplying the weighting coefficient ω by the output of each of the first, second, and third subtracting circuit, respectively; and fourth, fifth, and sixth adders 126-a, 126-b, and 126-c for adding the output of the seventh, eighth, and ninth multipliers to the three components (R, G, and B) of the input trichromatic color signal, respectively.

The operation of this second color adjustment operating circuit 12 is described next.

Selective color adjustment can thus be enabled by respectively subtracting the three components (R$_h$, G$_h$, B$_h$) of the second color conversion circuit 11 output from the three components (R, G, and B) of the input trichromatic color signal, multiplying each resulting difference by the weighting coefficient ω output by the weighting coefficient setting circuit 6, adding the three components (R, G, and B) of the input trichromatic color signal to each product, and performing interior division with the input trichromatic color signal (R, G, B) using the interior division ratio determined by the weighting coefficient ω.

Furthermore, this embodiment of the invention can be comprised with fewer multipliers, the scale of the circuit can be reduced, and excellent practical effectiveness is obtained even when constructed with a low operation precision analog processor because there is little effect on the operation result by comprising the second color adjustment operating circuit 12 with first, second, and third subtracting circuit for subtracting the three components (R, G, and B) of the trichromatic color input signal from the three components (R$_h$, G$_h$, B$_h$) of the second color conversion circuit 11 output, seventh, eighth, and ninth multipliers for multiplying the weighting coefficient ω by the output of each of the first, second, and third subtracting circuit, respectively, and fourth, fifth, and sixth adders for adding the output of the seventh, eighth, and ninth multipliers to the three components (R, G, and B) of the input trichromatic color signal, respectively.

An alternative embodiment of the invention is described below.

Figure 14:
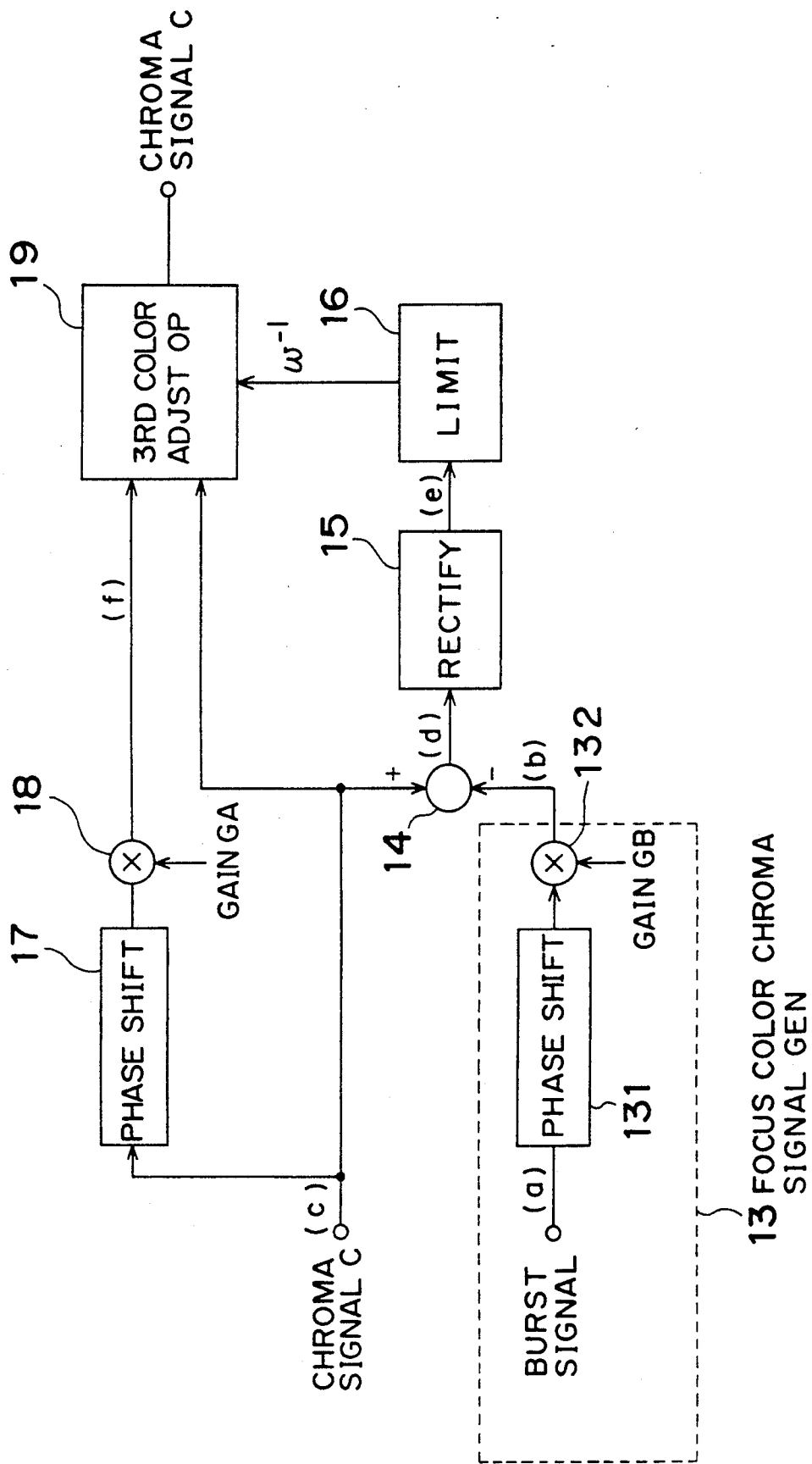
FIG. 14 is a block diagram of a color adjustment apparatus according to a sixth embodiment of the invention.

FIG. 14 is a block diagram of a color adjustment apparatus according to this alternative embodiment of the invention. As shown in FIG. 14, this embodiment comprises a pointed color chroma signal generating circuit 13 for generating a pointed color chroma signal representing the hue and saturation of the pointed color, which is the median color of the color adjustment area. In this embodiment the pointed color chroma signal representing the hue and saturation of the pointed color to be adjusted is generated by shifting the phase of the color burst signal included in the video signal (an NTSC signal in this embodiment) by means of a phase shift circuit 131, and amplifying the output of the phase shift circuit 131 using a first amplifying circuit 132. This pointed color chroma signal is subtracted from the input chroma signal by the subtracting circuit 14 to generate a sine wave (hereinafter the difference chroma signal) representing the difference between the hue and saturation in the input color and the pointed color. The output sine wave of the subtracting circuit 14 is then rectified and smoothed by the rectification smoothing circuit 15. The output level of the rectification smoothing circuit 15 is then limited by the limiter 16 to a predetermined maximum output level, and the output of the limiter 16 is normalized by this predetermined output level.

The phase of the input chroma signal is shifted by a phase shift circuit 17, and the amplitude of the phase-shifted input chroma signal is then amplified by the second amplifying circuit 18. The third color adjustment operating circuit 19 thus obtains the color adjusted chroma signal based on the output of the limiter 16 from the input chroma signal and the phase shifted, amplified chroma signal (hereinafter the converted chroma signal) output from the phase shift circuit 17 and second amplifying circuit 18.

The operation of the color adjustment apparatus according to the present embodiment of the invention is described below with reference to FIGS. 14 and 15.

Figure 15:
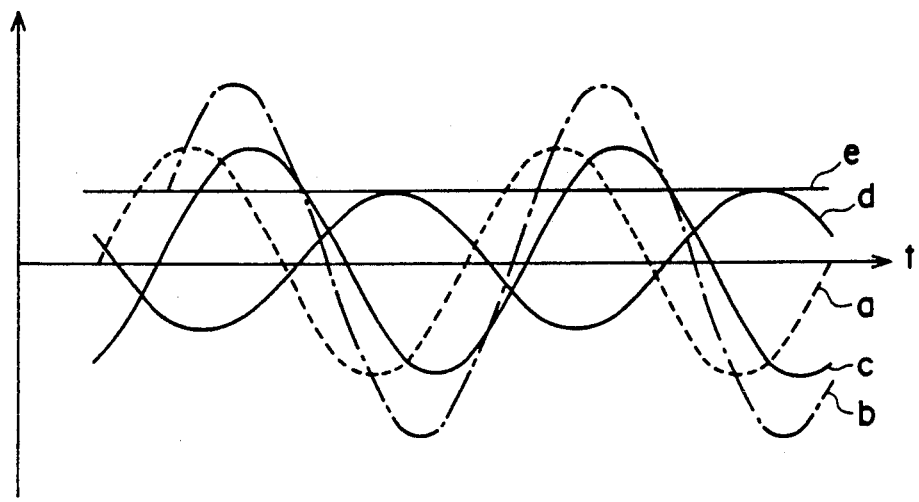
FIG. 15 is a waveform diagram of the signal wave as it passes through the various components of the embodiment shown in FIG. 14.
Figure 16:
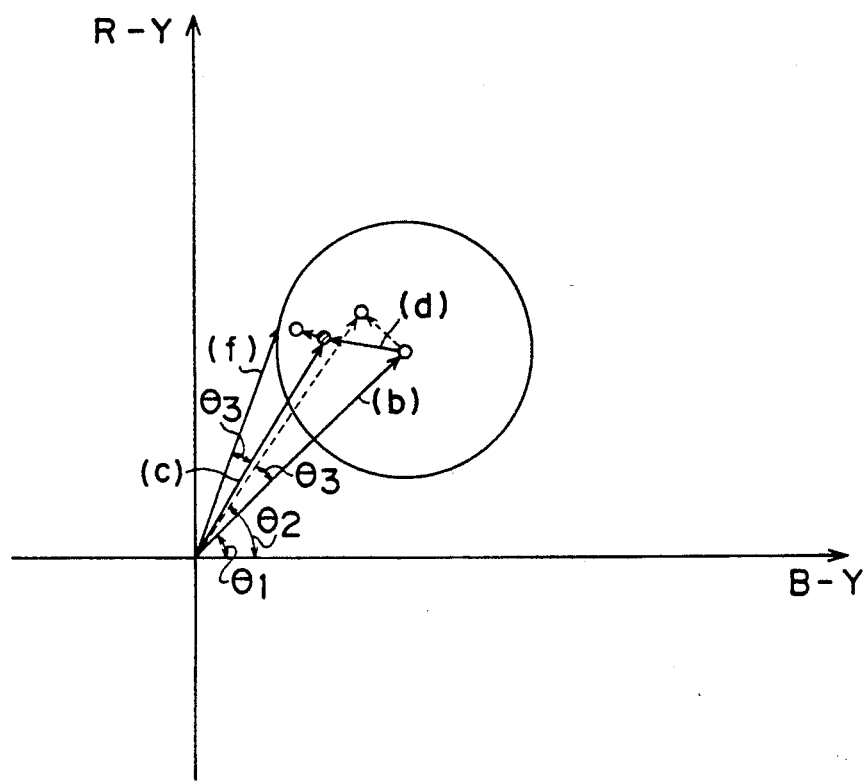
FIG. 16 is the vector graph of the operation of a color adjustment apparatus according to a sixth embodiment of the invention.

FIG. 15 is a waveform diagram of the signal wave as it passes through the various components shown in FIG. 14. FIG. 16 is the vector graph of the same signal.

A standard color burst signal as shown in FIG. 15 (a) is first input to the phase shift circuit 131 of the pointed color chroma signal generating circuit 13, and the phase of the signal is shifted to the phase angle for the hue of the pointed color. The phase shifted signal is then amplified by gain $G_B$ to the amplitude of the pointed color saturation, resulting in the pointed color chroma signal (indicated by wave (b) and vector (b) in FIGS. 15 and 16, respectively).

The pointed color chroma signal is then subtracted from the input chroma signal, (FIG. 16 (c)) shown as wave (c) in FIG. 15, by the subtracting circuit 14, resulting in the difference chroma signal, shown as FIG. 15 (d) and FIG. 16 (d). This difference chroma signal represents the difference between the color of the pointed color and the input color, specifically the difference between the hue and saturation of the two colors.

This difference chroma signal is input to the rectification smoothing circuit 15 for rectification and smoothing. The rectified and smoothed wave is indicated as (e) in FIG. 15. This rectified and smoothed output signal also represents the distance between the pointed color (b) and the input color (c) on the color difference plane (R-Y, B-Y plane) as shown by (d) in FIG. 16.

Figure 17:
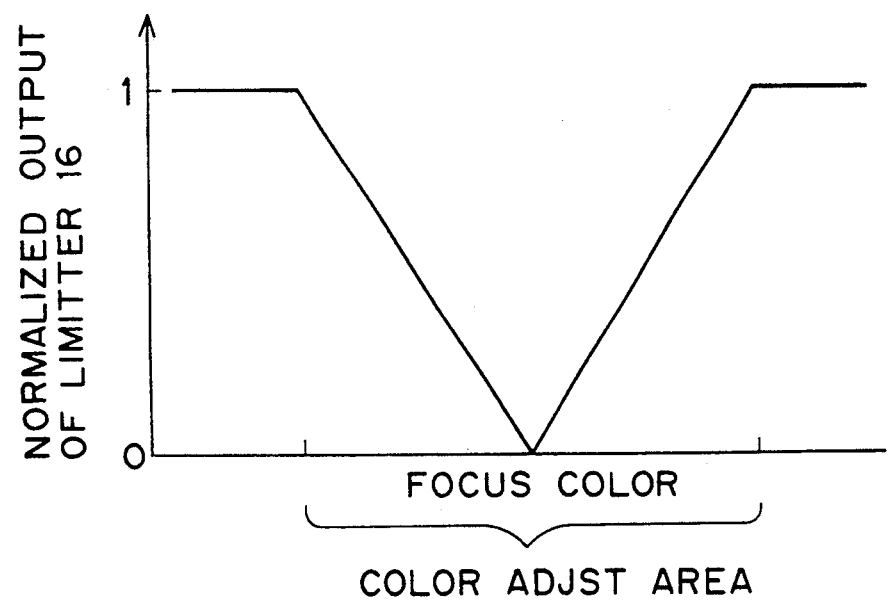
FIG. 17 is an output wave diagram of the limiter of the sixth embodiment of the invention.
Figure 18:
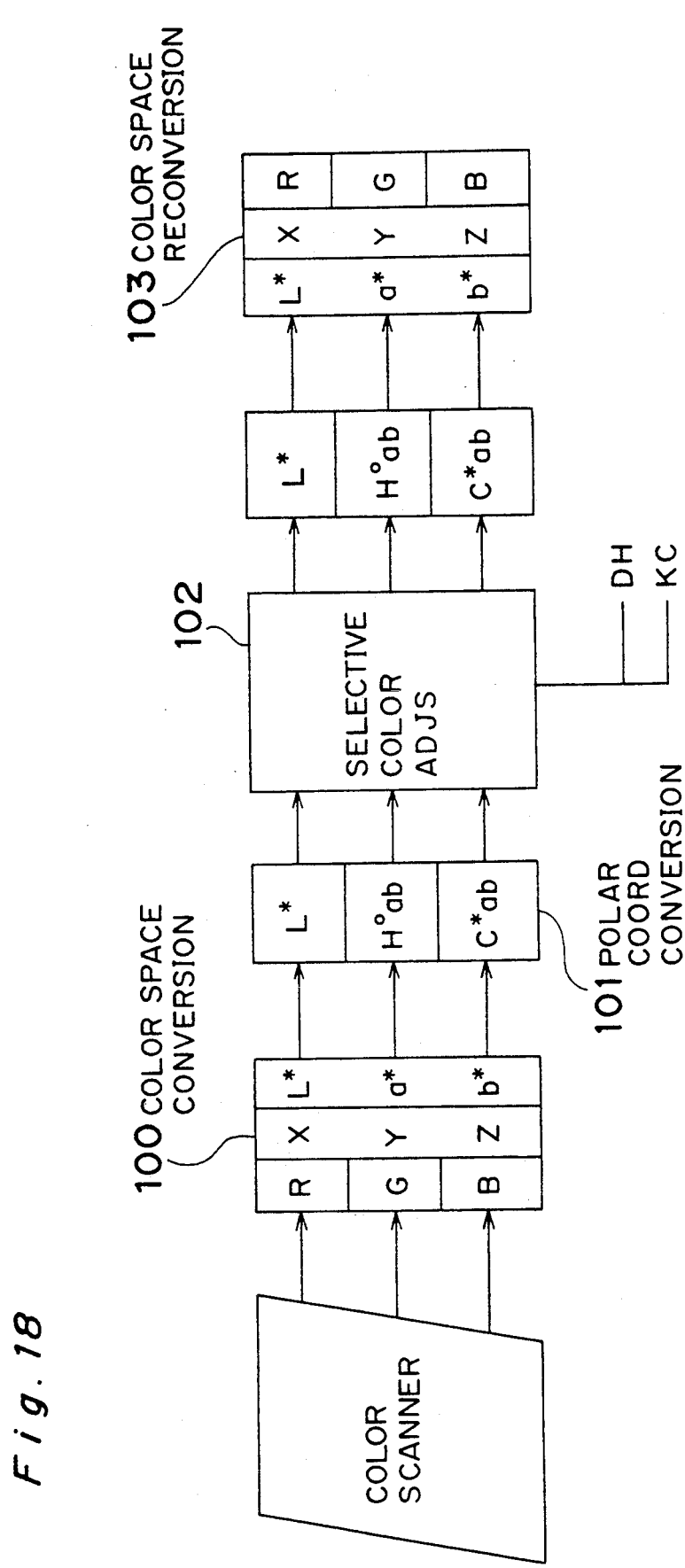
FIG. 18 is a block diagram of a conventional color adjustment apparatus.
Figure 19:
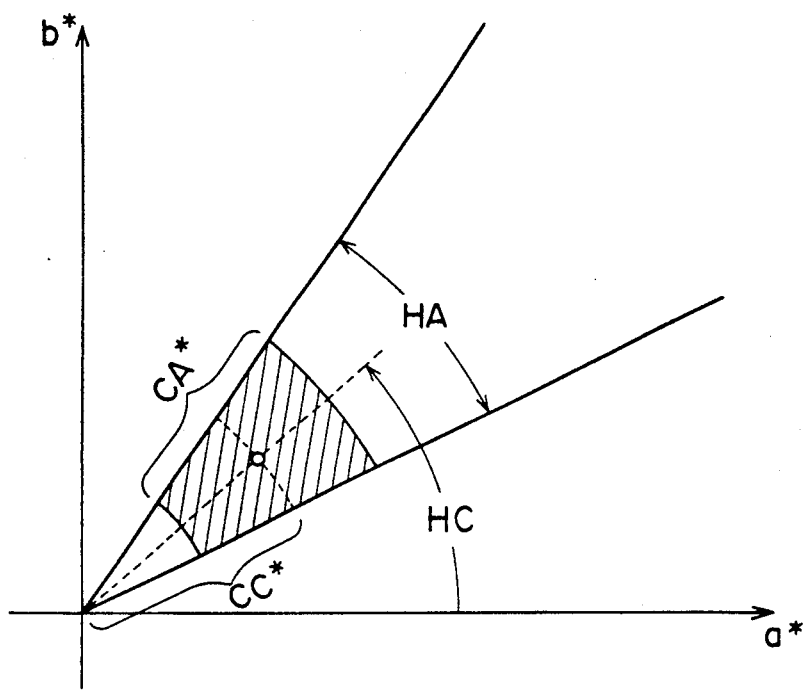
FIG. 19 is a graph of the method of specifying the color adjustment area in the conventional color adjustment apparatus.
Figure 20:
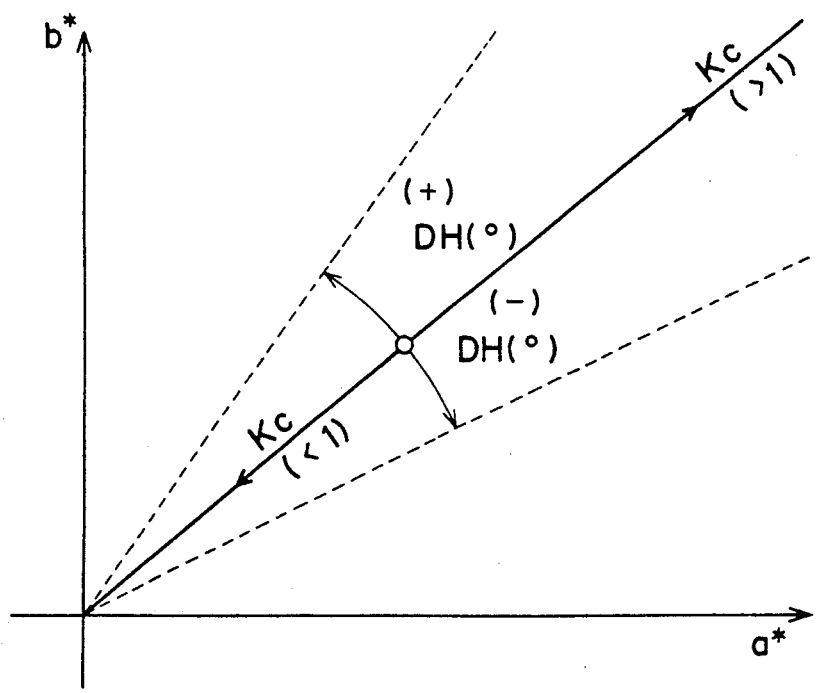
FIG. 20 is a graph of the color adjustment specification method in the conventional color adjustment apparatus.

The output (e) of the rectification smoothing circuit 15 is then input to the limiter 16, which limits the signal level to a predetermined maximum level (the threshold level). This threshold level is represented by the circle in FIG. 16, the center point of which is the pointed color and the area of which is the color adjustment area. The level limited output of the rectification smoothing circuit 15 is then normalized by the threshold level. The output of the limiter 16 thus becomes a wave as shown in FIG. 17, and is used as the weighting coefficient $\omega$ representing the degree of color adjustment applied. The maximum value of the weighting coefficient $\omega$ is at the boundary of and outside the color adjustment area, and the minimum value is at the pointed color.

The color adjusted chroma signal can then be obtained by an interior division operation performed by the third color adjustment operating circuit 19 on the input chroma signal and the converted chroma signal based on the weighting coefficient $\omega$ set as described above. The equation (13) representing this interior division operation is shown below $$C(g) = \omega \times C(c) + (1-\omega) \times C(f) \quad (13)$$

where C(c) is the input chroma signal, C(f) is the converted chroma signal, and C(g) is the color-adjusted chroma signal.

The present embodiment of the invention can thus selectively adjust the color of a given area while retaining continuity with the colors outside the color adjustment area because a weighting coefficient corresponding to the color difference of the input color and the pointed color is applied during phase shift and amplification of the input chroma signal, and the color adjusted chroma signal is obtained from the amplified output and the input chroma signal by means of an interior division operation applied by the color adjustment operating circuit. It is integral to this embodiment that the weighting coefficient is obtained by subtracting the pointed color chroma signal, representing the hue and saturation of the pointed color to be adjusted, generated by the pointed color chroma signal generating circuit 13 from the pointed color and the input chroma signal, generating a sine wave representing the difference between the hue and saturation of the input color and the pointed color, rectifying and smoothing this sine wave by means of a rectification smoothing circuit, and limiting the output level of the rectification smoothing circuit by the limiter to the color adjustment area.

In addition, this embodiment of the invention can be constructed with a very simple circuit because complex non-linear processing is not required, and processing can be completed by direct manipulation of the brightness chroma signal.

Furthermore, this embodiment is suited to real-time processing of video signals and other image signals because the entire operation can be completed with analog processing.

As described hereinabove, selective color adjustment retaining color continuity and without inversion of colors inside and outside the color adjustment area is made possible by a color adjustment apparatus comprising a chromaticity signal combining the two elements of the rectangular coordinate system of the plane representing two of the three attributes of color, specifically the hue and saturation components; a pointed color chromaticity signal setting circuit for setting the chromaticity signal at the center of the color area to be converted by color adjustment; a color adjustment area setting circuit for setting the color adjustment area of which the center is the pointed color chromaticity signal set by the pointed color chromaticity signal setting circuit; a target color chromaticity signal setting circuit for setting the chromaticity signal of the desired color resulting from conversion of the chromaticity signal set by the pointed color chromaticity signal setting circuit; a first color conversion circuit that operates on the overall color plane so that the pointed color chromaticity signal is converted to the chromaticity signal of the desired color based on the output of the pointed color chromaticity signal setting circuit and the target color chromaticity signal setting circuit; a weighting coefficient setting circuit for setting the weighting coefficient representing the degree of color adjustment according to the input chromaticity signal; and a color adjustment operating circuit for generating a chromaticity signal between the input chromaticity signal and the chromaticity signal of the output from the first color conversion circuit when the same chromaticity signal is input thereto according to the output of the weighting coefficient setting circuit.

As described hereinabove, selective color adjustment retaining color continuity and without inversion of colors inside and outside the color adjustment area is made possible by an alternative color adjustment apparatus comprising a color space conversion circuit for converting a trichromatic signal to a chromaticity signal combining the two elements of the rectangular coordinate system of the plane representing two of the three attributes of color, specifically the hue and saturation components; a pointed color color signal setting circuit for setting the trichromatic color signal at the center of the color area to be converted by color adjustment; a color adjustment area setting circuit for setting the area in the rectangular coordinate system used for color adjustment centered on the chromaticity signal obtained from the pointed color color signal set by the pointed color color signal setting circuit; a target color color signal setting circuit for setting the trichromatic color signal of the desired color to be achieved by converting the pointed color color signal set by the pointed color color signal setting circuit; a color conversion circuit that operates on the overall color space so that the trichromatic color signal of the pointed color is converted to the trichromatic color signal of the desired color based on the trichromatic color signal set by the pointed color color signal setting circuit and the trichromatic color signal set by the target color color signal setting circuit; a weighting coefficient setting circuit for setting the weighting coefficient representing the degree of color adjustment according to the input chromaticity signal; and a color adjustment operating circuit for generating the trichromatic color signal between the input trichromatic color signal and the trichromatic color signal of the output from the second color conversion circuit for the same trichromatic color signal input according to the output of the weighting coefficient setting circuit.

The above embodiments can be constructed with an extremely simple, small-scale circuit because complex non-linear conversions to different polar coordinate systems are not necessary.

In addition, the invention can be constructed with a device having a relatively small bit capacity because non-linear conversion is used only for the color space conversion. Moreover, if the color space converted by the color space conversion circuit is represented by brightness difference signals, there is no need for any non-linear conversion operations, and the invention can be constructed with an even smaller device enabling real-time processing.

If a trichromatic color signal is used for the color conversion circuit, the invention is also a practical circuit of easily adjusting the brightness as well as the saturation and hue.

Selective color adjustment of a given adjustment area while retaining continuity with colors outside the area is also possible in a device of simple construction according to another alternative embodiment of a color adjustment apparatus comprising a pointed color chroma signal generating circuit for generating the pointed color chroma signal representing the saturation and hue of the pointed color to be color adjusted; subtracting circuit for subtracting this pointed color chroma signal from the input chroma signal; a rectification smoothing circuit for rectifying and smoothing the output of the subtracting circuit; a limiter for limiting the output of the rectification smoothing circuit; phase shift circuit for shifting the phase of the input chroma signal and the limiter output; an amplification circuit for amplifying the output of the phase shift circuit by a given gain level; and a color adjustment operating circuit for obtaining the output chroma signal from the input chroma signal and the amplification circuit output based on the output of the rectification smoothing circuit.

This embodiment also enables real-time processing because all processes can be easily completed with analog processing. In addition, all processes can be performed by direct manipulation of the brightness chroma signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color adjustment apparatus comprising:
   a means for obtaining a chromaticity signal representing two elements of a rectangular coordinate system of a plane representing two of the three attributes of color, specifically hue and saturation components;
   a pointed color chromaticity signal setting means for setting a pointed color chromaticity signal;
   a color adjustment area setting means for setting in the rectangular coordinate system a color adjustment area of which the center is the pointed color chromaticity signal set by the pointed color chromaticity signal setting means;
   a target color chromaticity signal setting means for setting in the rectangular coordinate system a target color chromaticity signal;
   a first color conversion means for generating a converted chromaticity signal $(u_h^*, v_h^*)$ in said color adjustment area, said converted chromaticity signal obtained by shifting an original chromaticity signal $(u^*, v^*)$ by an amount equal to a change from said pointed color chromaticity signal to said target color chromaticity signal;
   a weighting coefficient setting means for setting a weighting coefficient $(\omega)$ representing the degree of color adjustment according to the input chromaticity signal such that the weighting coefficient is highest at the center of said color adjustment area, and is reduced towards the peripheral of said color adjustment area; and a first color adjustment operating means for generating a corrected chromaticity signal ($u_0^*$, $v_0^*$) which is a sum of said converted chromaticity signal and said original chromaticity signal added at the rate of said weighting coefficient ($\omega$).

2. A color adjustment apparatus according to claim 1, wherein said obtaining means is a color space conversion means which converts a color signal to coordinates on the uniform color space, and said chromaticity signal being an observer chromaticness index.

3. A color adjustment apparatus according to claim 1, wherein said obtaining means is a color space conversion means which converts a color signal to a brightness signal and a color difference signal, and said chromaticity signal being a color difference signal.

4. A color adjustment apparatus according to claim wherein said first color conversion means carries out a two-row, two-line linear conversion of said original chromaticity signal, and wherein said first color adjustment operating means carries out a linear operation on the original chromaticity signal and the converted chromaticity signal according to the weighting coefficient ($\omega$).

5. A color adjustment apparatus according to claim 1, wherein said first color conversion means carries out a calculation:

$$\begin{pmatrix} u_h^* \\ v_h^* \end{pmatrix} = \begin{pmatrix} k \cdot \cos\theta & k \cdot \sin\theta \\ -k \cdot \sin\theta & k \cdot \cos\theta \end{pmatrix} \begin{pmatrix} u^* \\ v^* \end{pmatrix},$$

wherein k is a coefficient for a saturation.

6. A color adjustment apparatus according to claim 1, wherein said first color adjustment operating means carries out a calculation:

$$u_0^* = (1 - \omega)u^* + \omega \cdot u_h^*$$
$$v_0^* = (1 - \omega)v^* + \omega \cdot v_h^*.$$

7. A color adjustment apparatus according to claim 1, wherein said first color adjustment operating means comprises:

a subtracting means for subtracting said converted chromaticity signal ($u_h^*$, $v_h^*$) from said original chromaticity signal ($u^*$, $v^*$);

a multiplying means for multiplying said weighting coefficient ($\omega$) by the output of said subtracting means; and an adding means for adding the output of the multiplying means and said original chromaticity signal ($u^*$, $v^*$).

8. A color adjustment apparatus comprising:

a color space conversion means for converting a trichromatic signal to a chromaticity signal representing the two elements of the rectangular coordinate system of the plane representing two of the three attributes of color, specifically the hue and saturation components;

a pointed color color signal setting means for setting a pointed color signal expressed by trichromatic color;

a color adjustment area setting means for setting in a rectangular coordinate system an area used for color adjustment with said pointed color signal located at the center thereof;

a target color color signal setting means for setting a target color signal expressed by trichromatic color;

a second color conversion means for generating a converted color signal ($R_h$, $G_h$, $B_h$) in said color adjustment area, said converted color signal obtained by shifting an original color signal (R, G, B) by an amount equal to a change from said pointed color signal to said target color signal;

a weighting coefficient setting means for setting a weighting coefficient ($\omega$) such that the weighting coefficient is highest at the center of said color adjustment area, and is reduced towards the peripheral of said color adjustment area; and a second color adjustment operating means for generating a corrected color signal (Rc, Gc, Bc) which is a sum of said converted color signal and said original color signal added at the rate of said weighting coefficient ($\omega$).

9. A color adjustment apparatus according to claim 8, wherein said color space conversion means produces, as the chromaticity signal, an observer chromaticness index in the uniform color space from the trichromatic color signal.

10. A color adjustment apparatus according to claim 8, wherein the color space conversion means produces, as the chromaticity signal, a color difference signal obtained from the trichromatic color signal.

11. A color adjustment apparatus according to claim 8, wherein said second color conversion means carries out a three-row, three-column linear conversion of said original color signal, and wherein said second color adjustment operating means carries out a linear operation on the original color signal and the converted color signal according to the weighting coefficient ($\omega$).

12. A color adjustment apparatus according to claim 8, wherein said second color conversion means carries out a calculation:

$$\begin{pmatrix} R_h \\ G_h \\ B_h \end{pmatrix} = \begin{pmatrix} a11 & a12 & a13 \\ a21 & a22 & a23 \\ a31 & a32 & a33 \end{pmatrix} \begin{pmatrix} R \\ G \\ B \end{pmatrix}.$$

13. A color adjustment apparatus according to claim 8, wherein said second color adjustment operating means carries out a calculation:

$$Rc = (1 - \omega) \times R + \omega R k_h$$
$$Gc = (1 - \omega) \times G + \omega G k_h$$
$$Bc = (1 - \omega) \times B + \omega B k_h.$$

14. A color adjustment apparatus according to claim 8, wherein said first color adjustment operating means comprises:

a subtracting means for subtracting said converted color signal ($Rk_h$, $Gk_h$, $Bk_h$) from said original color signal (R, G, B);

a multiplying means for multiplying said weighting coefficient ($\omega$) by the output of said subtracting means; and an adding means for adding the output of the multiplying means and said original color signal (R, G, B).

15. A color adjustment apparatus according to claim 1, wherein said weighting coefficient setting means comprises:

a chromaticity coordinate conversion means for converting the original chromaticity signal to the coordinate system of a chromaticity plane, said chromaticity plane representing the hue and saturation components of color by means of two elements on a rectangular coordinate system, and the origin of the coordinate system being said pointed color chromaticity signal;

a color adjustment area coordinate conversion means for converting an original chromaticity area to the coordinate system of a chromaticity plane; and a weighting coefficient generating means for generating the weighting coefficient within the limits of the area set by the color adjustment area coordinate conversion means such that the weighting coefficient has a value of 1 at the origin of the chromaticity coordinates, decreases continuously according to the distance from the origin, and has a value of 0 at the limits of the color adjustment area.

16. A color adjustment apparatus according to claim 1, wherein said weighting coefficient setting means comprises:

a chromaticity coordinate conversion means for converting the input chromaticity signal to the coordinate system of a chromaticity plane, said chromaticity plane representing the hue and saturation components of color by means of two elements on a rectangular coordinate system, and the origin of the coordinate system being said pointed color chromaticity signal;

a color adjustment area coordinate conversion means for converting an original chromaticity area to the coordinate system of a chromaticity plane;

two weighting coefficient generating means for generating a separate weighting coefficient for each element axis of the chromaticity signal representing two elements on the rectangular coordinate system of the plane coordinate-converted by the chromaticity coordinate conversion means such that the weighting coefficient has a value of 1 on each element axis, decreases continuously according to the distance from the axis, and has a value of 0 at the limits perpendicular to each axis of the color adjustment area set by the color adjustment area setting means; and a fuzzy logic multiplying means for generating the weighting coefficient by obtaining the fuzzy logic product of the output of each of the two weighting coefficient generating means.

17. A color adjustment apparatus according to claim 1, wherein the color adjustment area set by the color adjustment area setting means is a rectangular area on the chromaticity plane.

18. A color adjustment apparatus according to claim 8, wherein said weighting coefficient setting means comprises:

a chromaticity coordinate conversion means for converting the original chromaticity signal to the coordinate system of a chromaticity plane, said chromaticity plane representing the hue and saturation components of color by means of two elements on a rectangular coordinate system, and the origin of the coordinate system being said pointed color chromaticity signal;

a color adjustment area coordinate conversion means for converting an original chromaticity area to the coordinate system of a chromaticity plane; and a weighting coefficient generating means for generating the weighting coefficient within the limits of the area set by the color adjustment area coordinate conversion means such that the weighting coefficient has a value of 1 at the origin of the chromaticity coordinates, decreases continuously according to the distance from the origin, and has a value of 0 at the limits of the color adjustment area.

19. A color adjustment apparatus according to claim 8, wherein said weighting coefficient setting means comprises:

a chromaticity coordinate conversion means for converting the input chromaticity signal to the coordinate system of a chromaticity plane, said chromaticity plane representing the hue and saturation components of color by means of two elements on a rectangular coordinate system, and the origin of the coordinate system being said pointed color chromaticity signal;

a color adjustment area coordinate conversion means for converting an original chromaticity area to the coordinate system of a chromaticity plane;

two weighting coefficient generating means for generating a separate weighting coefficient for each element axis of the chromaticity signal representing two elements on the rectangular coordinate system of the plane coordinate-converted by the chromaticity coordinate conversion means such that the weighting coefficient has a value of 1 on each element axis, decreases continuously according to the distance from the axis, and has a value of 0 at the limits perpendicular to each axis of the color adjustment area set by the color adjustment area setting means; and a fuzzy logic multiplying means for generating the weighting coefficient by obtaining the fuzzy logic product of the output of each of the two weighting coefficient generating means.

20. A color adjustment apparatus according to claim 8, wherein the color adjustment area set by the color adjustment area setting means is a rectangular area on the chromaticity plane.

21. A color adjustment apparatus comprising:

a means for inputing chromaticity signal;

a pointed color chromaticity signal generating means for generating a pointed color chromaticity signal representing the saturation and hue of the pointed color;

a subtracting means for subtracting the pointed color chromaticity signal from an original chromaticity signal;

a rectification smoothing means for rectifying and smoothing the output of the subtracting means;

a limiting means for limiting the output of the rectification smoothing means to be within a predetermined maximum level;

a phase shift means for shifting the phase of the original chromaticity signal;

an amplification means for amplifying the output of the phase shift means by a predetermined gain level to produce an amplified chromaticity signal; and a third color adjustment operating means for performing an interior division operation on the original chromaticity signal and the amplified chromaticity signal to obtain a color adjusted chromaticity signal.

* * * * *

UNITED STATES PATENT AND TRADEMARK OFFICE
CERTIFICATE OF CORRECTION

PATENT NO. : 5,289,295
DATED : February 22, 1994
INVENTOR(S) : Yumiba et al.

It is certified that error appears in the above—identified patent and that said Letters Patent is hereby corrected as shown below:

column 23, line 16,
after the word "claim" insert --1--.

column 24, lines 47-49
the calculation $$"Rc = (1 - \omega) \times R + \omega Rk_h$$
$$Gc = (1 - \omega) \times G + \omega Gk_h$$
$$Bc = (1 - \omega) \times B + \omega Bk_h "$$

should be $$--Rc = (1 - \omega) \times R + \omega \times Rk_h$$
$$Gc = (1 - \omega) \times G + \omega \times Gk_h$$
$$Bc = (1 - \omega) \times B + \omega \times Bk_h --.$$

Signed and Sealed this

Thirtieth Day of August, 1994

Attest:

BRUCE LEHMAN

*Attesting Officer*     *Commissioner of Patents and Trademarks*